US008327024B2

(12) United States Patent
Pattison et al.

(10) Patent No.: US 8,327,024 B2
(45) Date of Patent: Dec. 4, 2012

(54) SYSTEM AND METHOD FOR SMS/IP INTEROPERABILITY

(75) Inventors: Ian McLean Pattison, Edinburgh (GB); Roland Zink, Neu-Anspach (DE)

(73) Assignee: 724 Solutions Software, Inc., Santa Barbara, CA (US)

( * ) Notice: Subject to any disclaimer, the term of this patent is extended or adjusted under 35 U.S.C. 154(b) by 693 days.

(21) Appl. No.: 11/937,695

(22) Filed: Nov. 9, 2007

(65) Prior Publication Data
US 2009/0049202 A1 Feb. 19, 2009

Related U.S. Application Data

(63) Continuation-in-part of application No. 11/796,707, filed on Apr. 27, 2007.

(60) Provisional application No. 60/746,037, filed on Apr. 29, 2006.

(51) Int. Cl.
G06F 15/16 (2006.01)

(52) U.S. Cl. ......... 709/246; 709/205; 709/206; 455/466

(58) Field of Classification Search ........................ None
See application file for complete search history.

(56) References Cited

U.S. PATENT DOCUMENTS

| 3,798,817 | A | * | 3/1974 | Zanoni | 42/42.01 |
| 4,941,170 | A | | 7/1990 | Herbst | |
| 5,826,017 | A | | 10/1998 | Holzmann | |
| 5,991,812 | A | | 11/1999 | Srinivasan | |
| 6,085,236 | A | | 7/2000 | Lea | |
| 6,097,950 | A | * | 8/2000 | Bertacchi | 455/432.2 |
| 6,108,559 | A | * | 8/2000 | Åstrom et al. | 455/466 |
| 6,173,327 | B1 | | 1/2001 | DeBorst | |
| 6,199,099 | B1 | | 3/2001 | Gershman et al. | |
| 6,298,232 | B1 | * | 10/2001 | Marin et al. | 455/413 |
| 6,336,135 | B1 | | 1/2002 | Niblett et al. | |
| 6,343,313 | B1 | | 1/2002 | Salesky et al. | |
| 6,549,587 | B1 | * | 4/2003 | Li | 375/326 |
| 6,640,248 | B1 | | 10/2003 | Jorgensen | |
| 6,721,395 | B2 | * | 4/2004 | Martinez | 379/45 |
| 6,741,610 | B1 | * | 5/2004 | Volftsun et al. | 370/466 |

(Continued)

FOREIGN PATENT DOCUMENTS

WO WO 2007127422 A2 11/2007

(Continued)

OTHER PUBLICATIONS

International Search Report and Written Opinion for PCT/US07/010325 mailed Jun. 10, 2008 (10 pages).

(Continued)

*Primary Examiner* — Ian N Moore
*Assistant Examiner* — Dung B Huynh
(74) *Attorney, Agent, or Firm* — Sprinkle IP Law Group

(57) ABSTRACT

Systems and methods for interoperability are disclosed which allow for a user of one network to communicate seamlessly with a user of another network. Users are provided seamless access to data services in different networks without having to subscribe to those networks. In one embodiment an application bridge comprising an application server may be used to service communications while a billing bridge may be provided to control and charge network subscribers. In one embodiment a user in a SMS domain may communicate with a user in an IP domain. In one embodiment, a platform may register with a federated interface of an IM domain to enable non-IM users to communicate with IM users.

15 Claims, 27 Drawing Sheets

U.S. PATENT DOCUMENTS

| | | | |
|---|---|---|---|
| 6,748,229 B1 * | 6/2004 | Calatrava-Requena et al. | 455/466 |
| 6,757,365 B1 * | 6/2004 | Bogard | 379/88.17 |
| 6,785,730 B1 | 8/2004 | Taylor | |
| 6,792,431 B2 * | 9/2004 | Tamboli et al. | 707/102 |
| 6,823,373 B1 | 11/2004 | Pancha et al. | |
| 6,912,389 B2 | 6/2005 | Bright et al. | |
| 6,957,077 B2 * | 10/2005 | Dehlin | 455/466 |
| 7,165,035 B2 | 1/2007 | Zinser et al. | |
| 7,181,538 B2 | 2/2007 | Tam et al. | |
| 7,185,049 B1 | 2/2007 | Benitez et al. | |
| 7,215,643 B2 | 5/2007 | Mussman et al. | |
| 7,266,611 B2 | 9/2007 | Jabri et al. | |
| 7,295,608 B2 | 11/2007 | Reynolds et al. | |
| 7,328,042 B2 | 2/2008 | Choksi | |
| 7,509,431 B2 | 3/2009 | Singhal et al. | |
| 7,548,987 B2 | 6/2009 | Jabri et al. | |
| 7,650,415 B1 | 1/2010 | Peterson | |
| 7,805,532 B2 | 9/2010 | Pattison et al. | |
| 7,929,683 B1 * | 4/2011 | Tran et al. | 379/221.01 |
| 2002/0007398 A1 * | 1/2002 | Mendiola et al. | 709/206 |
| 2002/0065935 A1 | 5/2002 | Koperda et al. | |
| 2002/0122547 A1 | 9/2002 | Hinchey | |
| 2002/0155826 A1 * | 10/2002 | Robinson et al. | 455/412 |
| 2002/0186723 A1 | 12/2002 | Sprague et al. | |
| 2003/0016639 A1 | 1/2003 | Kransmo et al. | |
| 2003/0087632 A1 * | 5/2003 | Sagi et al. | 455/414 |
| 2003/0110212 A1 * | 6/2003 | Lewis | 709/203 |
| 2003/0224814 A1 * | 12/2003 | Qu et al. | 455/517 |
| 2004/0032881 A1 | 2/2004 | Arai | |
| 2004/0093202 A1 | 5/2004 | Fischer et al. | |
| 2004/0121785 A1 | 6/2004 | Vance et al. | |
| 2004/0152477 A1 * | 8/2004 | Wu et al. | 455/466 |
| 2004/0229608 A1 * | 11/2004 | Isukapalli et al. | 455/432.1 |
| 2005/0009541 A1 * | 1/2005 | Ye et al. | 455/466 |
| 2005/0027866 A1 * | 2/2005 | Seurujarvi et al. | 709/227 |
| 2005/0044144 A1 * | 2/2005 | Malik et al. | 709/205 |
| 2005/0101337 A1 * | 5/2005 | Wilson et al. | 455/466 |
| 2005/0108328 A1 | 5/2005 | Berkeland et al. | |
| 2005/0114533 A1 * | 5/2005 | Hullfish et al. | 709/230 |
| 2005/0143136 A1 | 6/2005 | Lev et al. | |
| 2005/0165913 A1 * | 7/2005 | Coulombe et al. | 709/219 |
| 2005/0197108 A1 | 9/2005 | Salvatore et al. | |
| 2005/0271059 A1 | 12/2005 | Young et al. | |
| 2006/0052113 A1 * | 3/2006 | Ophir et al. | 455/456.1 |
| 2006/0053227 A1 | 3/2006 | Ye et al. | |
| 2006/0068762 A1 * | 3/2006 | Baldwin et al. | 455/412.1 |
| 2006/0142010 A1 * | 6/2006 | Tom et al. | 455/445 |
| 2007/0016390 A1 | 1/2007 | Bernardo et al. | |
| 2007/0076857 A1 | 4/2007 | Chava et al. | |
| 2007/0110076 A1 * | 5/2007 | Brouwer et al. | 370/395.52 |
| 2008/0045246 A1 * | 2/2008 | Murtagh et al. | 455/466 |
| 2008/0051119 A1 * | 2/2008 | Bouckaert et al. | 455/466 |
| 2008/0147864 A1 | 6/2008 | Drogo de Iacovo et al. | |
| 2008/0182548 A1 | 7/2008 | Pattison et al. | |
| 2008/0263137 A1 | 10/2008 | Pattison et al. | |

FOREIGN PATENT DOCUMENTS

| | | |
|---|---|---|
| WO | WO 2007130312 A2 | 11/2007 |
| WO | WO 2009061677 A1 | 5/2009 |

OTHER PUBLICATIONS

International Search Report and Written Opinion for PCT/US08/82062 mailed Jan. 9, 2009 (8 pages).

Patent Cooperation Treaty, International Preliminary Report on Patentability and Written Opinion for PCT/US07/010325 mailed Nov. 13, 2008, 724 Software Solutions, 7 pages.

U.S. Patent and Trademark Office, Office Action issued in U.S. Appl. No. 11/796,572 mailed Nov. 14, 2008, Pattison, 7 pages.

Patent Cooperation Treaty, International Search Report and Written Opinion issued in PCT/US2007/010327, mailed Nov. 24, 2008, 724 Solutions Software, 10 pages.

Patent Cooperation Treaty, International Preliminary Report on Patentability and Written Opinion issued in PCT/US2007/010325, mailed Nov. 13, 2008, 724 Solutions Software, 7 pages.

Patent Cooperation Treaty, International Report on Patentability and Written Opinion issued in PCT/US2007/010327, mailed Dec. 31, 2008, 724 Solutions Software, 8 pages.

U.S. Patent and Trademark Office, Office Action issued in U.S. Appl. No. 11/796,572 mailed May 14, 2009, Pattison, 7 pages.

U.S. Patent and Trademark Office, Office Action issued in U.S. Appl. No. 11/796,707 mailed Jun. 18, 2009, Pattison, 12 pages.

U.S. Patent and Trademark Office, Office Action issued in U.S. Appl. No. 11/796,572 mailed Aug. 17, 2010, 9 pages.

Office Action issued in U.S. Appl. No. 11/796,572 mailed Mar. 8, 2010, 9 pgs.

International Preliminary Report on Patentability issued May 11, 2010 for PCT/US2008/082062, 6 pgs.

Notice of Allowance for U.S. Appl. No. 11/796,572, mailed Aug. 18, 2011, 20 pgs.

* cited by examiner

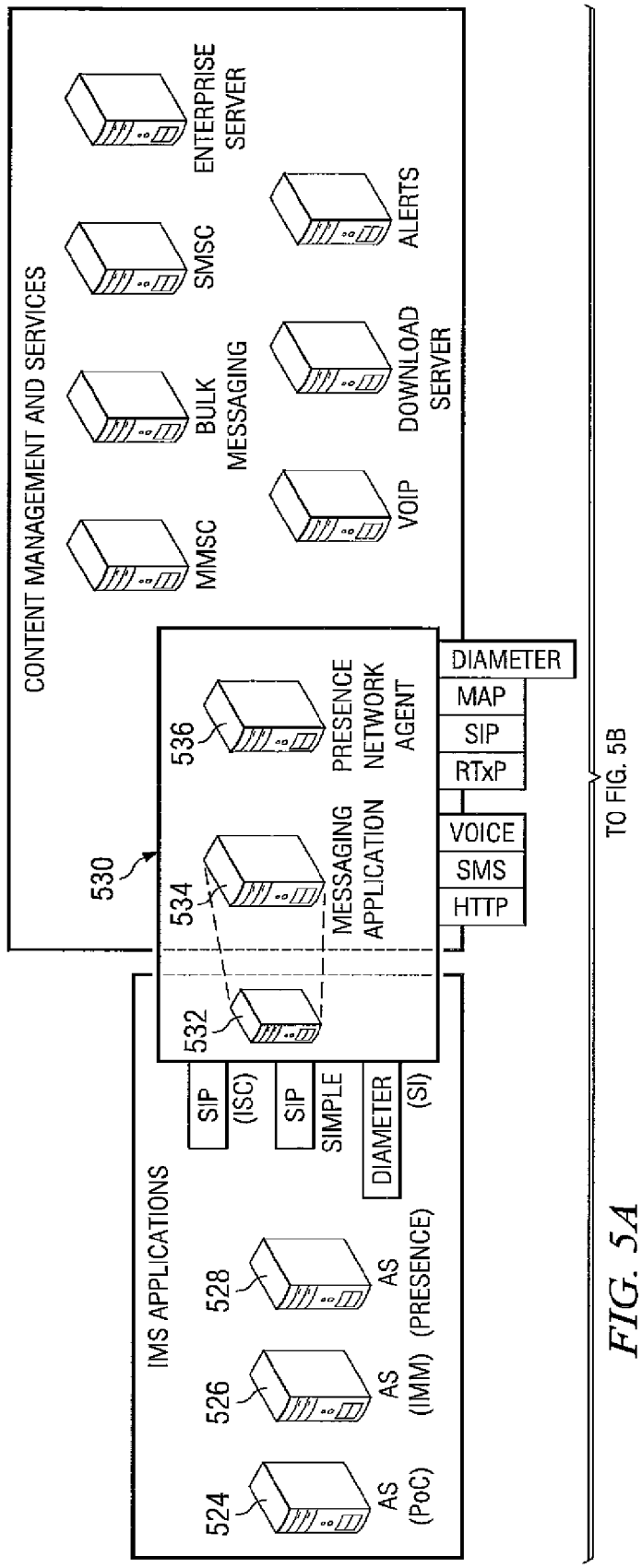
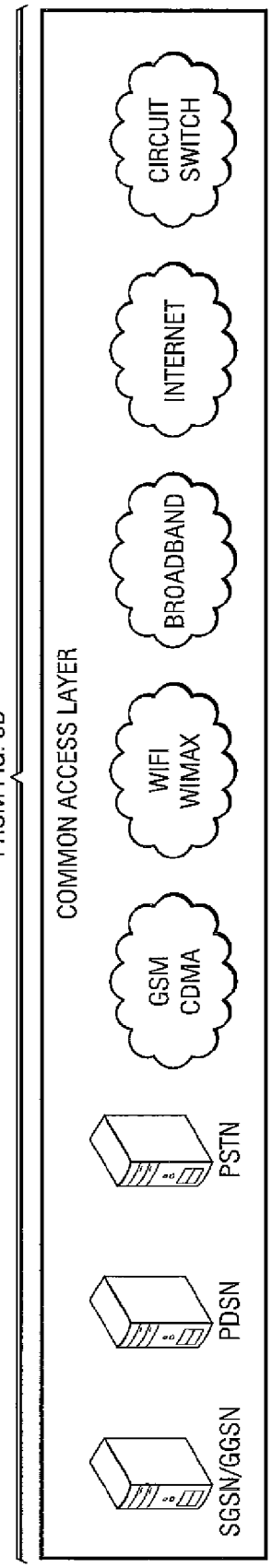
FIG. 5A
FIG. 5C

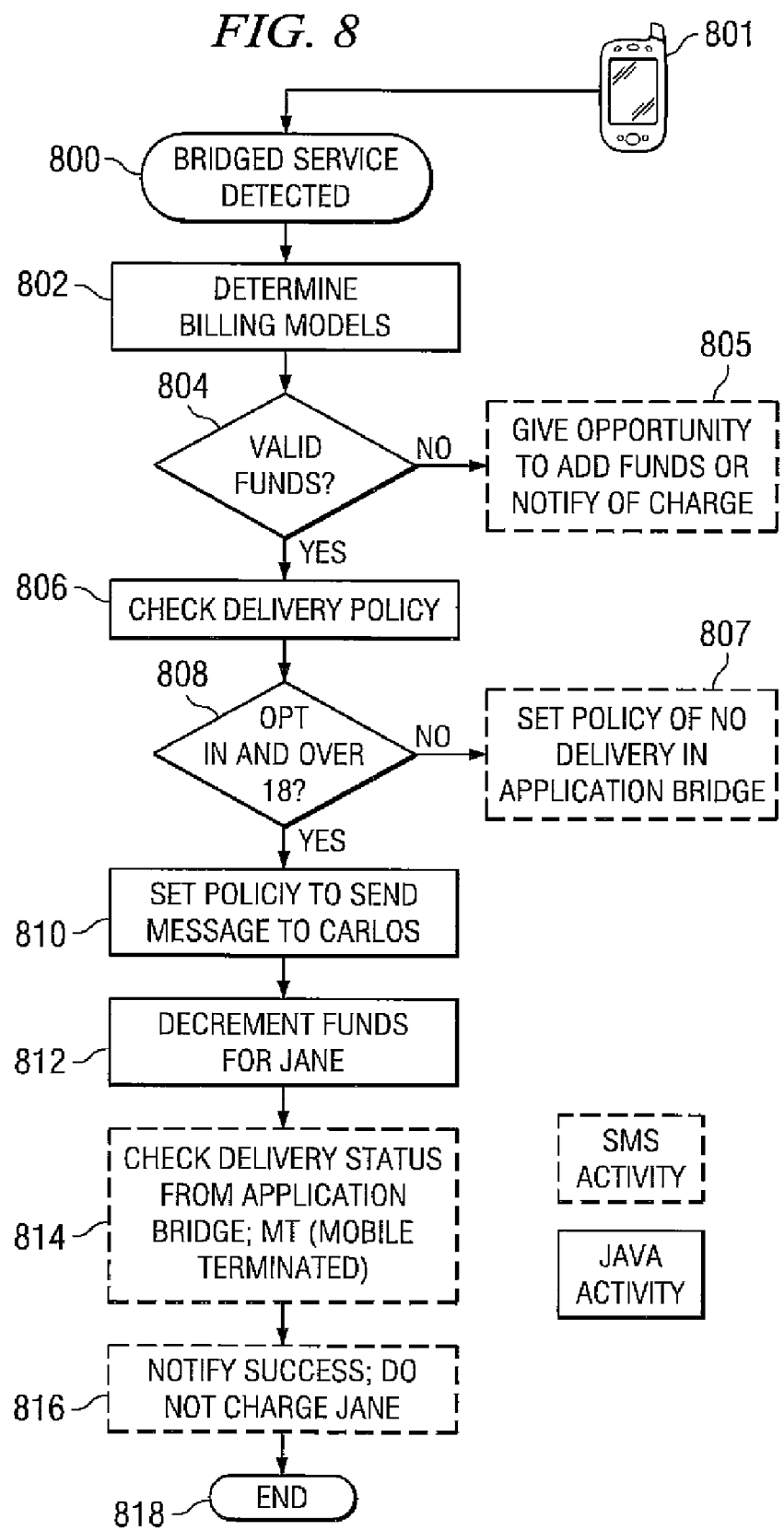

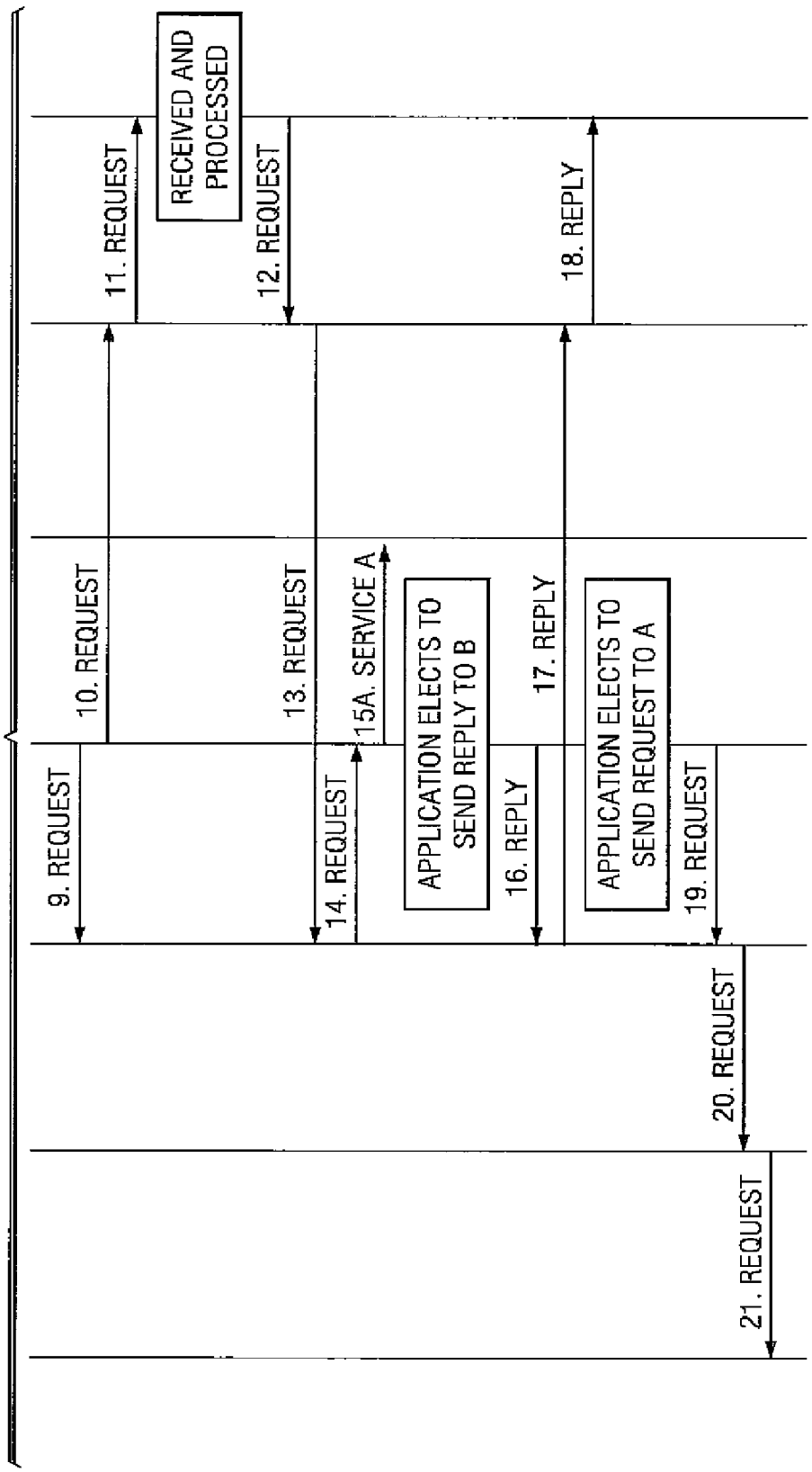

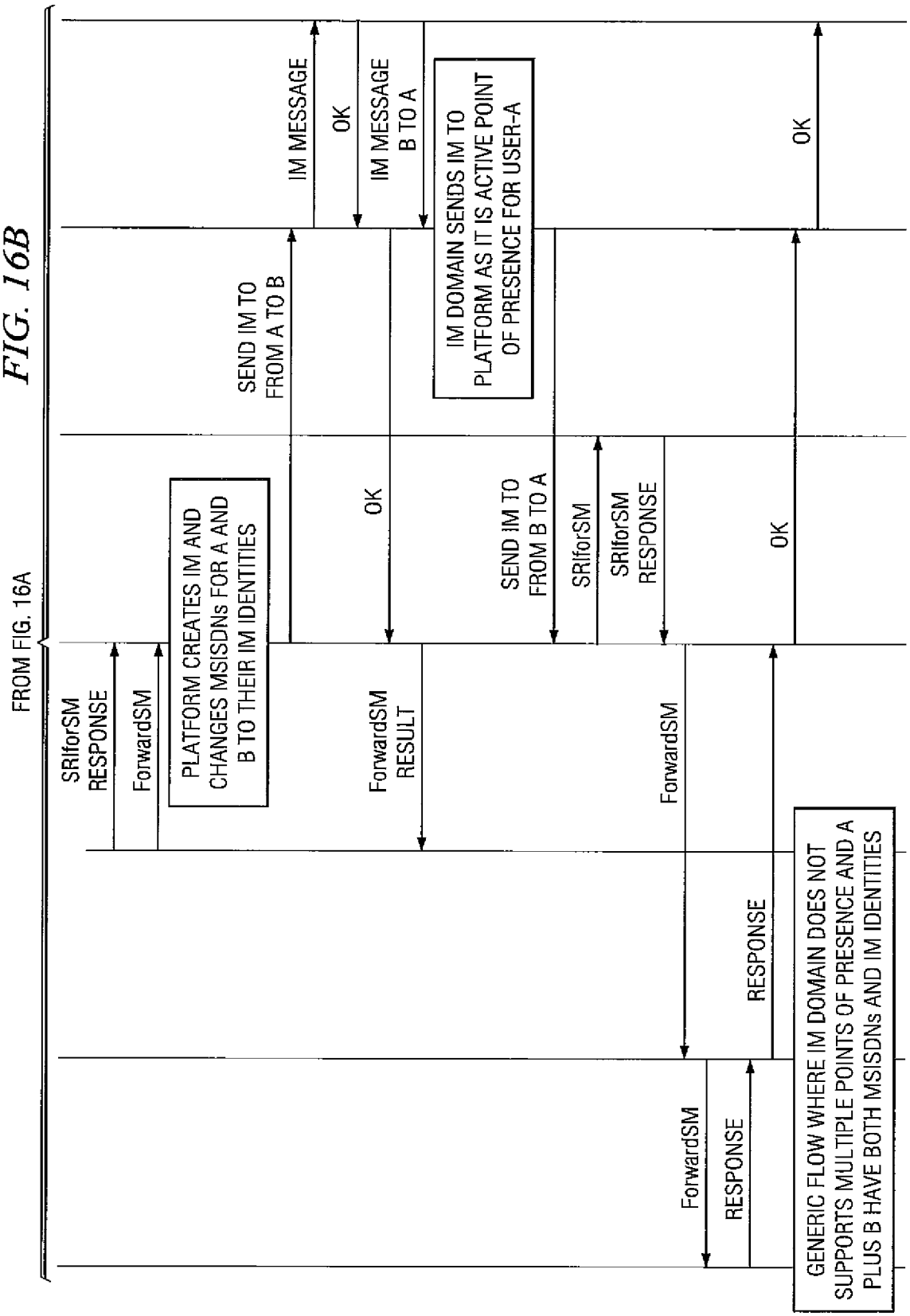

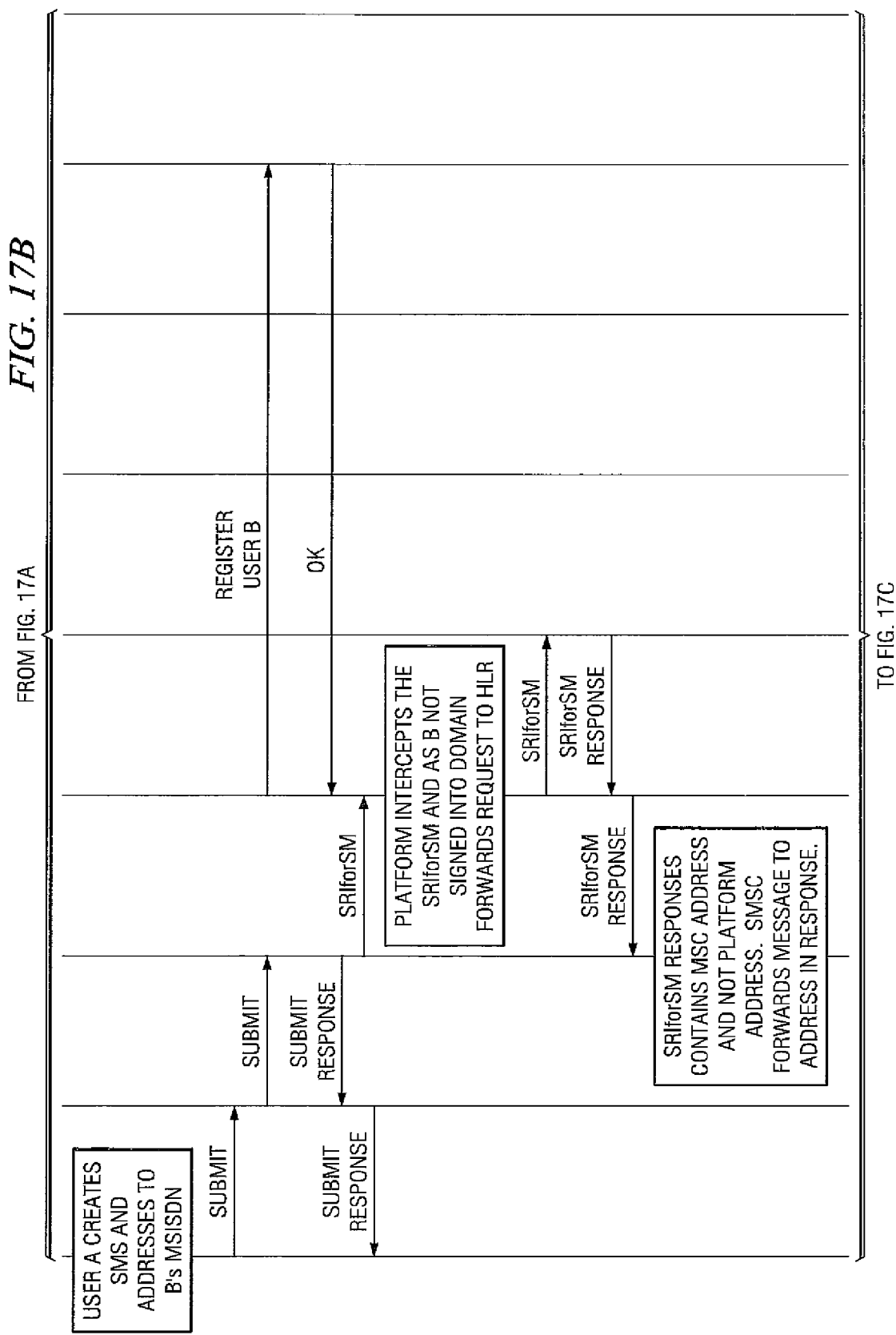

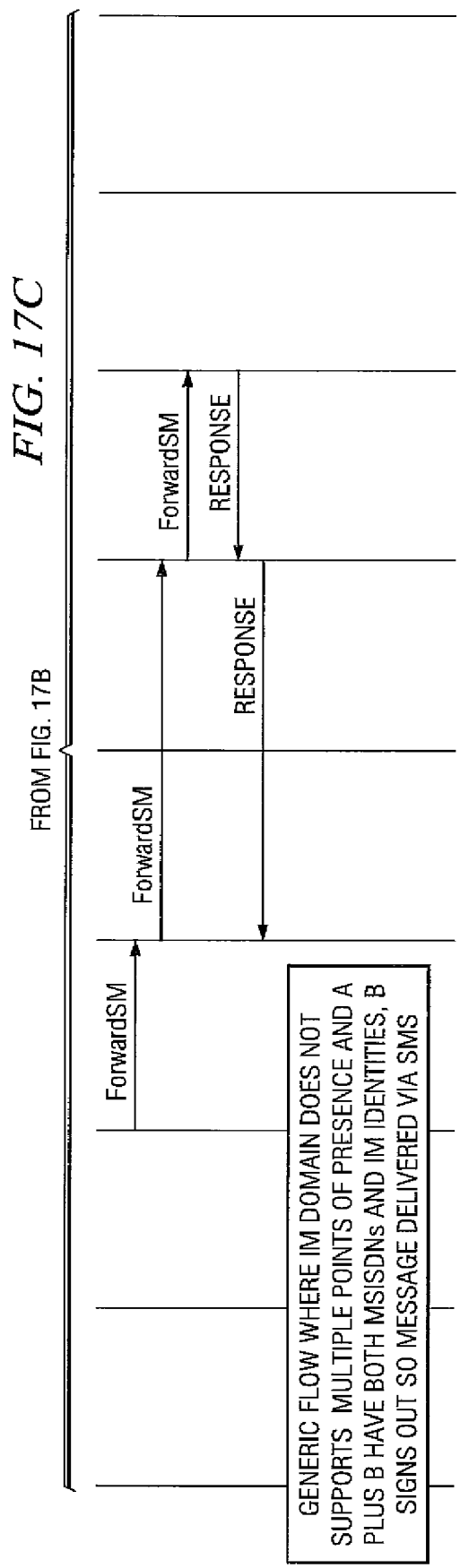

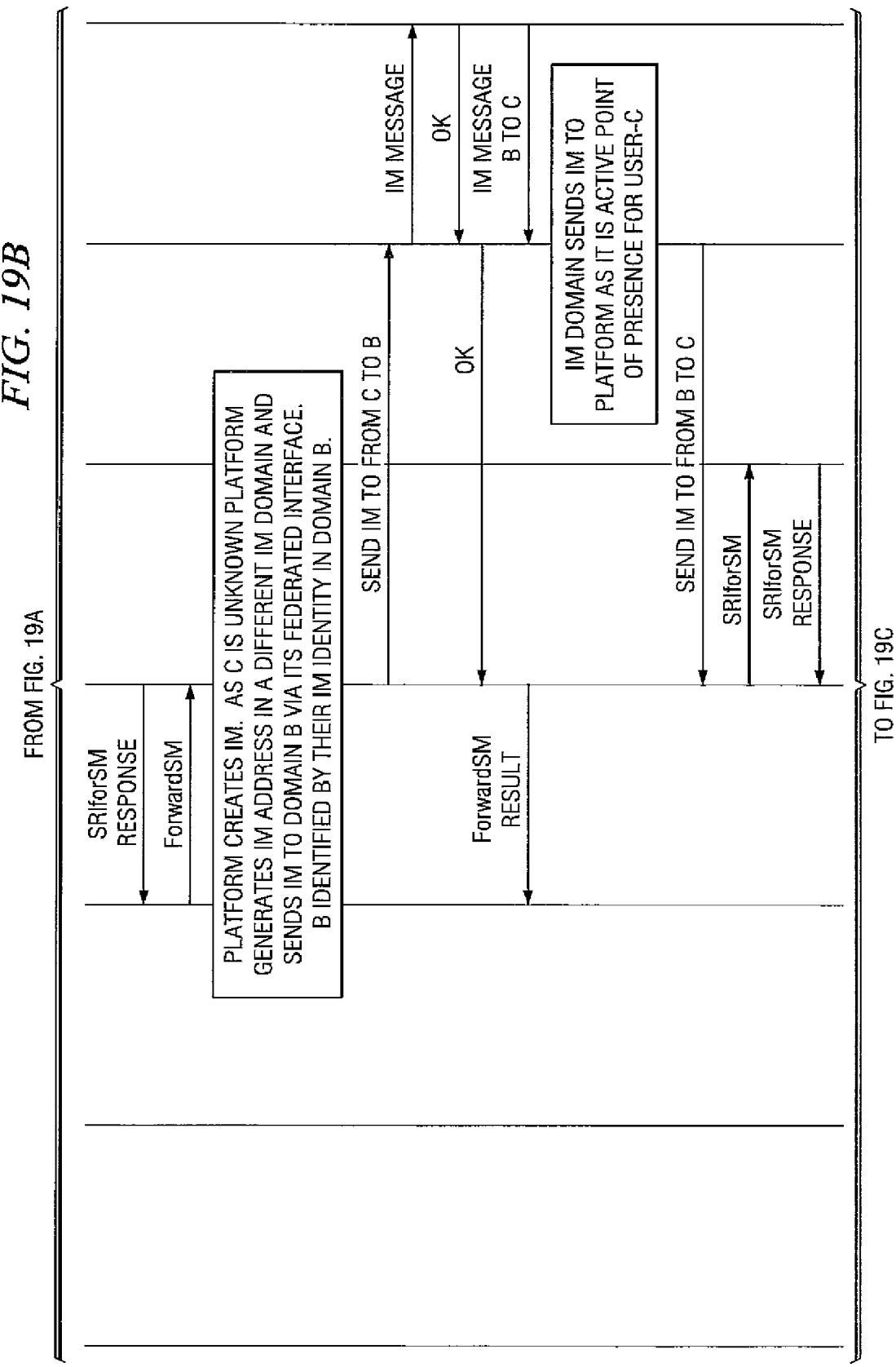

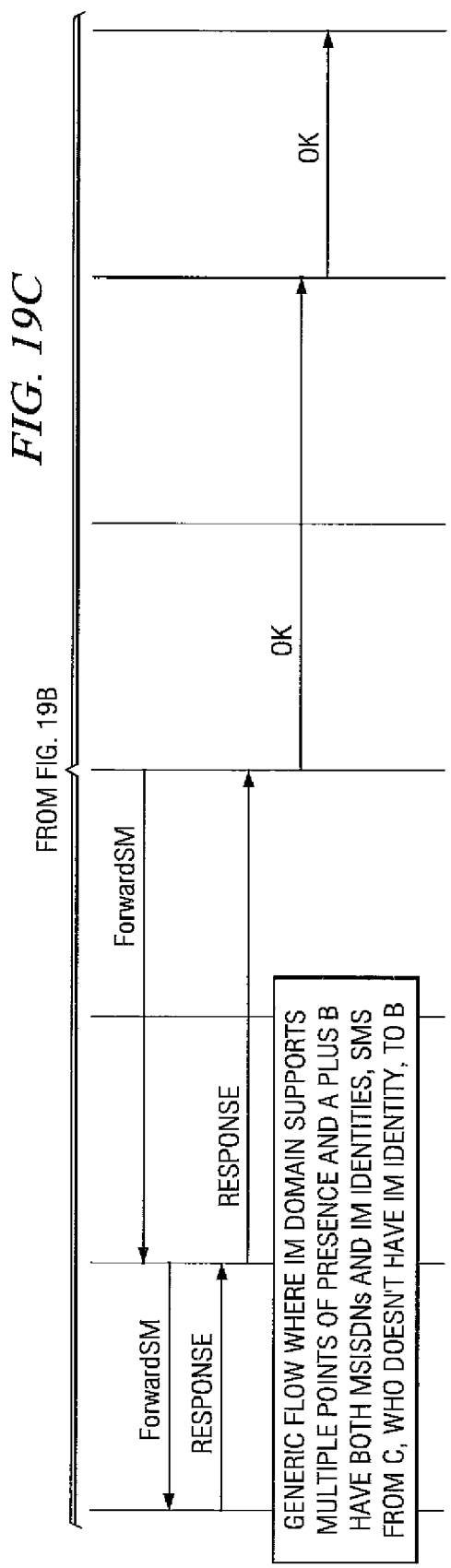

SYSTEM AND METHOD FOR SMS/IP INTEROPERABILITY

RELATED APPLICATIONS

This application is a continuation-in-part of U.S. patent application Ser. No. 11/796,707, by Ian Pattison, et al., entitled "Platform for Interoperability" filed on Apr. 27, 2007 which claims the benefit under 35 U.S.C. §119(e) of U.S. Provisional Application Ser. No. 60/746,037, by Michael Edward Luna, Ian McLean Paftison, Roland Zink, and Hanni Doch, entitled "Platform for Interoperability" filed Apr. 29, 2006 each of which is hereby incorporated by reference in its entirety.

FIELD OF THE INVENTION

The present invention is generally related to the field of telecommunications, and more particularly, to systems and methods for interoperability between or among disparate networks such as legacy networks or next generation networks.

BACKGROUND OF THE INVENTION

A number of different types of telecommunication networks and telecommunication protocols currently exist. For example, mobile networks use protocols that allow mobile device users to move from one location to another. Examples of mobile devices include, without limitation, mobile phones, personal digital assistants (PDAs), and laptops, etc.

Fixed networks provide data services in a fixed environment. An example of a fixed network is a DSL (digital subscriber line) network. A fixed network may be fixed wireless or fixed wireline. Fixed wireless is an alternative to fixed wireline, e.g., landline, coaxial cable, and copper connections. Fixed wireless refers to the operation of wireless devices or systems in fixed locations such as homes and offices. An example of fixed wireless is broadband wireless access in a home.

In addition, a number of different types of data services and different methods of communicating between or among devices currently exist. For example, Short Message Service (SMS) is a service for sending text messages to mobile phones and other devices.

As another example, Multimedia Messaging Service (MMS) is a communications technology that allows users to exchange multimedia messages and content between MMS-capable mobile phones and other MMS-capable devices. MMS requires users to have the same or compatible clients on both ends (or complex translation infrastructure).

Wireless Application Protocol (WAP) is a specification for a set of communication protocols to standardize the way that wireless devices, such as cellular telephones and radio transceivers, can be used for Internet access, including e-mail, the World Wide Web, newsgroups, and instant messaging, etc. WAP-based services require special browsers or infrastructure to access services. While Internet access has been possible in the past, different manufacturers have used different technologies.

IP Multimedia Subsystem (IMS) is defined by Third Generation Partnership Project (3GPP) as an architecture for multimedia sessions over IP. IMS and other advanced IP-based services such as Voice over IP (VoIP), which rely on new network topologies and new clients for access, may be considered separate networks as their architecture may fail to consider interoperability, a subscriber's identity, target client, or services beyond basic voice services.

Many other types of data services and methods of communicating exist, such as creating separate networks for IMS or other advanced services which also result in creating isolated services and islands of communities. This situation poses a barrier to interoperability.

Additionally, within these various mobile and fixed networks, there are multiple channels via which users can originate and/or receive messages or other forms of communication. In many cases, a single subscriber may have multiple identities, including different identities for phone-based services, such as voice and SMS or MMS, as well as identities for other communication channels such as instant messaging and e-mail.

SUMMARY OF THE INVENTION

Access to existing infrastructure and existing clients has been limited as specialized nodes are usually used for interworking and special provisioning usually must be made to enable access or inter-communication with existing subscribers. When new access methods and services are introduced, they are generally implemented in mobile and fixed wireless networks as discrete, end-to-end services which rely on specific clients or network technology to enable access. This typically limits the addressable subscriber population to only those with compatible technology. SMS, for example, has SMS clients communicating across SMS servers in the network. MMS servers use similar structure—MMS clients communicate via MMS servers on a network to other MMS clients. However, these may be two distinct networks. Thus, if an MMS message, even an MMS message containing only text content, is sent to an SMS enabled device, the message will not be delivered.

Enabling users of differing technology to communicate typically involves limited or complex methods and is usually accomplished by the introduction of functionality tailored specifically to the types of technologies or protocols which it is desired to bridge. For example, an MMS to email communication is possible, but this is accomplished by instituting some specific piece of functionality into the MMS infrastructure which accomplish this MMS-to-email communication (and which may not even accomplish an email-to-MMS communication).

These difficulties with interoperability have created problems with up-take and adoption of new technologies (e.g. next generation networks or protocols) by forcing users to update clients and services to maintain connectivity with others in their community. For example, SMS is very popular in Europe and Asia; newer IP-based networks that enable IM or email messages are also popular. Although IP-based networks may someday replace the SMS networks, IP-based networks account for only about 5% of the networks in Europe. Not all SMS-network users have IP-based network access, so even users with IP-based network access may want (or need) SMS-network access for reliable communication with SMS users. It also increases the time to pay-back investment in the installation or use of such new services and network infrastructures.

As can be seen in the above-described cases, interoperability between existing services and/or existing clients is approached on a service-by-service basis. This approach results in closed environments where the vendor providing a solution for new services or new clients defines the level of interoperability with existing services and/or clients, resulting in inconsistent and proprietary solutions. It also results in additional costs as there is not a consistent platform for providing interoperability between disparate services and or clients.

In addition, a limitation of existing technology is that in most cases, either the originator of a message must use the correct identity of the recipient for the channel via which the message is to be delivered, or there is a fixed mapping for a target address for a given service, which may be supported by, for example, DNS Enum, to convert a MSISDN (Mobile Subscriber ISDN Number) to a mail address to allow MMS-to-e-mail routing. As a result of this limitation, there is no capability to take into account a subscriber's current environment in deciding which of a user's identities should be used for expressing the originator's or recipient's identity. This is especially a limitation in environments which attempt to bridge from one communication channel to another.

Since new network technologies often introduce new ways of identifying or routing messages to a subscriber, the problem of identity management across network types arises. The industry is addressing this with the concept of a single identity, but the problem is better solved not with a single identity, but rather, by selecting the right identity for the subscriber based for example, on the network and type of device he or she is using at a given time.

As there are new data transport protocols and entire stacks introduced which manage the authentication, billing, and routing of messages in new networks. It would be desirable for these protocols to be seamlessly bridged between newer (e.g. next generation) networks or existing networks and legacy networks in a way that preserves both access management and billing services, as well as protocol transformation (which can be accomplished today with simple proxies and gateways).

Usually, each new service introduced is associated with a means to bill, provision, or track usages of a service (e.g., to enable business logic associated with the services). When considering inter-network interoperability, it would be desirable to provide a means to extend the business logic to subscribers that may be accessing the service from outside the network of origin.

This desire has driven the need for improved systems and methods for communication that overcome the deficiencies in the prior art. In accordance with one embodiment of the present invention, a platform is provided that leverages existing standards to seamlessly connect SMS networks to IP-based networks without complex subscriber or network-based provisioning. Embodiments of the present disclosure may intercept SMS messages in an SS7 network such that they can be delivered via IP. Advantageously, an SMS network and its subscribers appear as a seamless extension to the IP-based networks. An emulated interface as provided by embodiments of the present invention advantageously allows interoperability between new technology and existing technology without any specialized or proprietary support in the new technology domain. By providing an emulated interface between the networks and services, provisioning, management, and integration costs are advantageously reduced. Moreover, adoption of new technology is increased as a result of greater interoperability.

In accordance with one embodiment of the present invention, a method for interoperability is provided. A request is received from a user of a first network which communicates according to a first communication protocol. The request is normalized into a network-independent format. A billing policy may be determined. A channel of communication is selected. An identity is selected from a plurality of identities of a recipient user of a second network which communicates according to a second communication protocol. A request is generated for the second communication protocol and sent to the second network.

In accordance with another embodiment of the present invention, a system for network interoperability comprises a network bridge configured to translate and route data between a first network and a second network. The first network communicates according to a first communication protocol, and the second network communicates according to a second communication protocol. An application bridge is communicably coupled to the network bridge. The application bridge is configured to receive and respond to requests for content and services. A billing bridge may be provided, which is communicably coupled to the network bridge, and is configured to control access to content and services.

In accordance with another embodiment of the present invention, a system for interoperability between a first network communicating according to a first protocol and a second network communicating according to a second protocol comprises a Home Location Register (HLR) Proxy for intercepting SMS routing requests sent from a SMSC in a first network intended for a HLR in a second network and returning to the SMSC a response having address information, a Message Switching Center (MSC) Proxy associated with the address information returned to the SMSC and configured for receiving a message from the SMSC, an adapter configured to normalize a first communication received from the first network into a network-independent format, an application or network bridge, and one or more messaging emulators for sending the second communication to the second network. In some embodiments the application bridge includes an application layer comprising logic for determining a second communication valid for the second network and a component layer having services with selected functionality and accessible to the application layer. In some embodiments, the application bridge is configured to inspect the normalized first communication and to generate a second communication for the second network using one or more components based on the normalized first communication. In some embodiments, one or more of the one or more messaging emulators comprises an IP messaging emulator configured to generate the second communication for an IP network, wherein the IP messaging emulator is configured to send the second communication to a user in the second network based on presence information available to the IP messaging emulator in some embodiments, the IP messaging emulator is configured to receive an IP message from the address in the IP network, wherein the adapter is configured to normalize the IP message into a network-independent format and the application bridge is configured to inspect the normalized IP message and generate a third communication for the first network using one or more components based on the normalized IP message and send the third communication to the first network. In some embodiments, a system for interoperability includes an SMSC emulator configured to send a request to a HLR in the first network, receive a response from the HLR in the first network, and forward the third communication to a current Message Switching Center (MSC) in the first network.

In accordance with another embodiment of the present invention, a method for providing interoperability between networks, the method comprises the steps of receiving a request for address information, by a Home Location Register (HLR) Proxy, from a first network which communicates according to a first protocol, responding to the request with address information for a Message Switching Center (MSC) Proxy, receiving a first communication from the first network, by the MSC Proxy, normalizing the first communication, routing the normalized first communication to an application bridge or network bridge receiving the second communication from the application server, sending the second communication to an emulator, and routing the second communication to the second network which communicates according to a second protocol. In some embodiments, receiving a message from a first network comprises the step of receiving an SMS message, and wherein sending the second communication to an emulator comprises mapping the identities of the user in the first network and the user in the second network from MSISDNs to Internet Protocol (IP) identities, and sending an IP message to the IP messaging emulator. In some embodiments, a method for providing interoperability comprises registering with an IP domain on behalf of one or more users of the IP domain, wherein messages sent by the one or more users of the IP domain are received by an IP messaging emulator. In some embodiments, a method for providing interoperability comprises receiving presence update information about one or more users from an IP domain, and registering with the IP domain on behalf of one or more users based on the presence update information received from the IP domain.

In accordance with another embodiment of the present invention, a method for providing interoperability between a SMS network and an IP network comprises the steps of registering with an IP domain for a first user not registered with the IP domain, receiving an IP message from the IP domain from a second user registered with the IP domain, normalizing the IP message, routing the normalized IP communication to a bridge, generating a second communication for a second network which communicates according to a second protocol based on the normalized first communication, sending the second communication to an emulator and routing the second communication to the second network which communicates according to a second protocol. In some embodiments, registering with an IP domain may include the steps of sending a request for network presence information from an IP messaging emulator, receiving the presence information by the IP messaging emulator, and sending a request to register, by the IP messaging emulator, to the IP domain.

In accordance with another embodiment of the present invention, a machine-readable medium has stored thereon a set of instructions operable for causing the computer to intercept a request for address information from a first user in a first network, respond to the request with address information for a proxy, receive a first communication from the first user in the first network which communicates according to a first communication protocol, normalize the first communication, select a channel of communication, generate a second communication for a second user in a second network that communicates according to a second communication protocol based on the normalized first communication, select an identity of the first and second users based on the second network, and send the second communication to the second network. In some embodiments, the set of instructions may be operable to register with an IP domain for one or more users of a network. In some embodiments, the set of instructions may be operable to generate an IM identity for a non-user of an IM domain.

Embodiments of the present invention enable seamless interoperability between SMS and IP messaging domains by enabling the delivery of a SMS message to an IP messaging client using normal SMS creation, submission and delivery procedures. Embodiments of the present invention enable seamless interoperability between SMS and IP messaging domains by enabling normal delivery to take place within the IP messaging domain by ensuring that messages received by the IP messaging domain appear to have originated within the IP messaging domain. Embodiments of the present invention enable seamless interoperability between SMS and IP messaging domains by enabling the delivery of an Instant Message (IM) to a SMS client using normal IM creation procedures and normal SMS delivery procedures. Embodiments of the present invention enable seamless interoperability between SMS and IP messaging domains by enabling native identities to be used (i.e., MSISDNs in SMS messages and URIs or other relevant identity in IM messages.)

Embodiments of the present invention described herein may be implemented by software or hardware or both. For example, a machine-readable medium having stored thereon a plurality of executable instructions for implementing the methods of the present invention may be provided. The executable instructions may be stored as software code components or modules on one or more computer readable media (e.g., non-volatile memories, volatile memories, DASD arrays, magnetic tapes, floppy diskettes, hard drives, optical storage devices, or any other appropriate computer-readable medium or storage device). In one exemplary embodiment of the invention, the executable instructions may include lines of compiled C++, Java, HTML, or any other programming or scripting code.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements

BRIEF DESCRIPTION OF THE DRAWINGS

Embodiments of the inventive aspects of this disclosure will be best understood with reference to the following detailed description, when read in conjunction with the accompanying drawings, in which:

FIGS. 5A, 5B, and 5C depict a block diagram of an exemplary system for interoperability in accordance with one embodiment of the present invention;

FIG. 8 depicts a process flow diagram of an exemplary method for billing management in connection with the exemplary implementation of FIG. 7;

FIGS. 10A and 11B depict a generalized flow involving the billing bridge according to one embodiment of the present invention;

FIGS. 11A and 11B depict a diagram illustrating a generic processing flow that may occur at the Application Bridge in accordance with one embodiment of the present invention;

FIGS. 16A and 16B depict a flow diagram illustrating one embodiment for how a SMS message can be sent to a device in an IM domain in which the IM domain does not support multiple points of presence;

FIGS. 17A-17C depict a flow diagram illustrating one embodiment for how a SMS message can be sent to a device in an IM domain in which the IM domain does not support multiple points of presence;

FIGS. 19A-19C depict a flow diagram illustrating one embodiment for how a SMS message can be sent to a device in an IM domain in which the IM domain supports multiple points of presence.

DETAILED DESCRIPTION

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Figure 1:
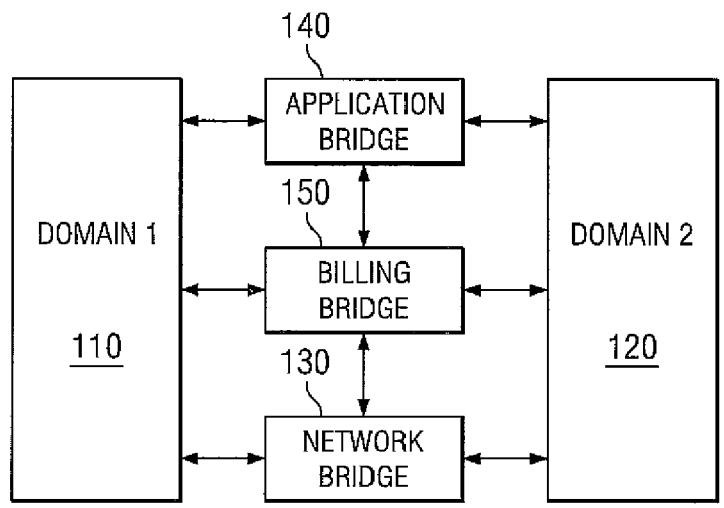
FIG. 1 depicts a block diagram of an exemplary platform for interoperability in accordance with one embodiment of the present invention.

Reference is now made to FIG. 1, which depicts a block diagram of an exemplary platform for interoperability in accordance with one embodiment of the present invention. As used herein, the term platform may refer to a system of hardware, such as servers, or a set of instructions, such as code, or both. A platform may include multiple servers distributed over a geographic area but appear as a single element, or may include a single element that may have multiple interfaces or otherwise appear as multiple elements.

In one embodiment, a seamless connection is provided between a first domain 110 and a second domain 120 without complex subscriber or network-based provisioning in either domain. For example, there is no need to provision non-IMS subscribers within an IMS domain. The first domain 110 may comprise, for example, a next-generation network such as IMS, SIP (Session Initiation Protocol), an IP based network, or another type of network, and the second domain 120 may comprise, for example, an existing legacy network, such as a circuit switched network or a public mobile land network. While two domains are depicted in FIG. 1 for ease of illustration, it should be understood that various other domains or various other types may also be included.

In accordance with one embodiment of the present invention, a network bridge 130, an application bridge 140 and a billing bridge 150 may be provided. Network bridge 130 may emulate the access interfaces (at the access layer) of the new network and the existing legacy network. Application bridge 140 provides a suite of applications and services that can be delivered to subscribers in both new and existing domains. Billing bridge 150 may also be provided to control and charge for access to value-added or premium services or content by users (e.g. subscribers or partners) of access channels. The aforementioned components may be deployed between the two domains, as depicted in FIG. 1, or, alternatively, they may be deployed in one or both domains 110, 120 or in conjunction with one or both domains 110, 120.

The network bridge 130 allows the security, access or service management mechanisms of domain 110 and those of domain 120 to coexist. For example, the network bridge 130 is responsible for the access protocols and translations required between access protocols in the domains 110, 120. The network bridge 130 supports multiple protocols including those utilized by domain 110, and those used by domain 120. In FIG. 1, the network bridge 130 may route requests from a first domain 110 to an appropriate server, such as application bridge 140, associated with the second domain 120 that provides the desired interoperability, and performs translations on requests or responses.

The application bridge 140 provides a suite of applications and services that can be delivered to subscribers in both domains 110, 120. The application bridge 140 supports the delivery and request of services via multiple channels. This allows the application bridge to appear as an application server in either or both of the domains 110 and 120. Indeed, in one embodiment, the application bridge enables inter domain interoperability of a service (e.g. between domains 110 and 120) by implementing the service in accordance with domain 110 and then making use of the capabilities of domain 120 to emulate the service to users within this domain.

A billing bridge 150 may also be provided. The billing bridge 150 may be implemented as software or hardware or both. The billing bridge 150 makes existing service management infrastructure, which may be used for controlling and charging for access to value added services and content, accessible to domains 110, 120 or networks associated with these domains 110, 120 via the appropriate interfaces. The billing bridge 150 controls and charges for access to value-added or premium services or content by subscribers or partners using a number of access channels.

The billing bridge 150 allows a MNO (mobile network operator) to reuse its existing investment in charging infrastructure for value-added services in conjunction with a new domain. Many MNOs have IP-based network infrastructure for managing and charging fees for access to premium content by both post-paid and prepaid subscribers and also managing relationships with a content provider (e.g., revenue sharing, reporting, etc.). The billing bridge 150 enables these types of infrastructures to be re-used for new services by providing a transparent bridge from new domains to the existing billing infrastructure.

Figure 2:
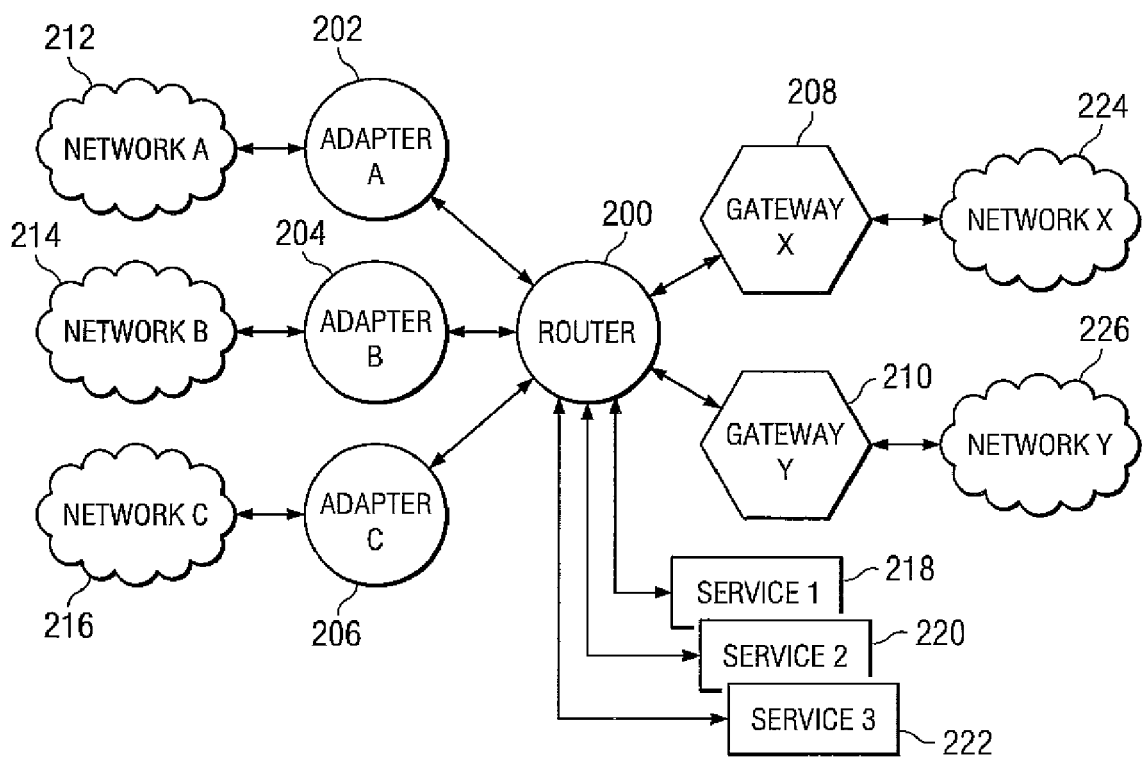
FIG. 2 depicts a block diagram of an exemplary network bridge in accordance with one embodiment of the present invention.

FIG. 2 depicts a block diagram of an exemplary implementation of one embodiment of network bridge 130. The network bridge 130 may be implemented as software or hardware or both. In accordance with certain embodiments of the present invention, the network bridge 130 is provided with contextual identity mapping support. In such embodiments, the network bridge 130 is able to receive communication requests via one or more of a number of different incoming channels. Each of these channels uses identities corresponding or associated with the channel to identify the users involved in the communication (e.g., recipients, originators, etc.). The network bridge 130 is further able to originate communications via a number of different outgoing channels. When originating traffic on an outgoing channel, the identity of users corresponds or is associated with the outgoing channel. The outgoing channel may be different than the incoming channel via which communication was received and hence the identities may be different. The network bridge 130 is also able to route requests from one channel to another and to perform identity mapping such that identities corresponding to the respective channel are always used on both channels. U.S. patent application Ser. No. 11/796,572, entitled "Contextual Based Identity" by inventors Ian McLean Pattison, Michael Edward Luna and Roland Zink, filed Apr. 27, 2007 describes a method for providing contextual identity mapping support, and is incorporated by reference.

In one embodiment, the network bridge 130 comprises a message switch 200 coupled to input protocol handlers (e.g., adapters 202, 204, and 206) and output gateways 208 and 210 such that routing, adaptation or other processing can be applied to communications (i.e. messages, requests or the like). The adapters 202, 204, and 206 allow requests to be received from different types of networks 212, 214, and 216. Adapters 202, 204 and 206 implement the protocol, such as SIP or SMTP, that the originator of a communication (e.g. in a domain 110, 120) will expect to use to communicate with another user. Adapters 202, 204, and 206 receive communications from networks 212, 214, and 216, and normalize the communication. U.S. Pat. No. 6,173,327 issued to Jeroen De Borst et al describes one method for normalizing communications and is incorporated fully herein by reference. Examples of adapters 202, 204, and 206 include without limitation a SIP network adapter enabling connectivity to IMS core network via, for example, ISC (IMS Service Control) interface, MAP/SS7 network adapter, etc. Advantageously, the use of normalized requests results in a generalized architecture such that when new domains are added, no new infrastructure is necessary, because only a new adapter is utilized to accommodate communications from that domain.

Examples of gateways 208 and 210 include without limitation a MAP/SS7 gateway, a HTTP gateway, a SIP gateway, etc. The services 218, 220, and 222 may include services beyond standard subscriber services. Examples of such services include without limitation delivering premium content, throttling, metering, content filtering such as parental controls, virus checking, and many others. In some embodiments, services 218, 220 and 222 include some or all the functionality of billing bridge 150. Advantageously, because requests are normalized before they reach router 200, services 218, 220, and 222 can be applied independent of the originating domain or protocol.

By bridging the networks with a multi-protocol based message switch, advanced services can be deployed in a newly added network domain and used by subscribers in the newly added domain and any legacy domains. Additionally, services in any legacy domain can be accessed from the new domain via the network bridge as if they were services deployed in the new domain.

Network bridge 130 may also have access to user profile information. In some embodiments, when a request is received at network bridge 130, the present invention checks to see if an end user has access to the same network. For example, if a client sends an MMS message, router 200 may check to see if the intended recipient is using equipment that has MMS capability. If so, then network bridge 130 may provide the functionality to send the message to the end user directly.

Thus, during operation, one or more communications may be received from a network 212, 214, 216. These communications are normalized by the adapter 202, 204, 206 and passed through router 200. Depending on a wide variety of criteria such as those elaborated on above including the networks or protocols utilized by the source and destination of the communication, the contents of the communication, applications associated with the communication, etc. the router may route these communications to one or more services 218, 220, 222 which may be applied in conjunction with the communication (e.g. the service may be applied to the communication or based on the communication) at network bridge 130, billing bridge 150 or application bridge 140. Similarly, communications originating from one or more services 218, 220, 222 intended for one or more destinations on networks 224, 226 may be received at router 200 and these communications routed to the gateway 208, 210 corresponding to the network 224, 226 associated with the destination. An advantage of network bridge 130 is that it appears as a standard element of both domain 110 and 120. Advantageously no special elements are needed in domains 110 and 120 in order to enable the bridging of these two disparate domains.

As may be realized, the application of services may allow a wide variety of functionality to be accomplished in conjunction with the reception of one or more communications. For example, a communication may be received and a service applied to translate this communication from one protocol to a different protocol corresponding to a destination for the communication. Similarly, at an application level a service may be applied to multiple communications, for example, multiple communications intended for a destination may be received and routed to a service which performs transcoding of content comprised by these communications to generate a new set of communications corresponding to the originally received set of communications. These new communications may then be routed to the destination, such that the user at the destination may receive communications tailored to the capabilities of his device where the manipulation of the original communication occurs unbeknownst to him.

Figure 3:
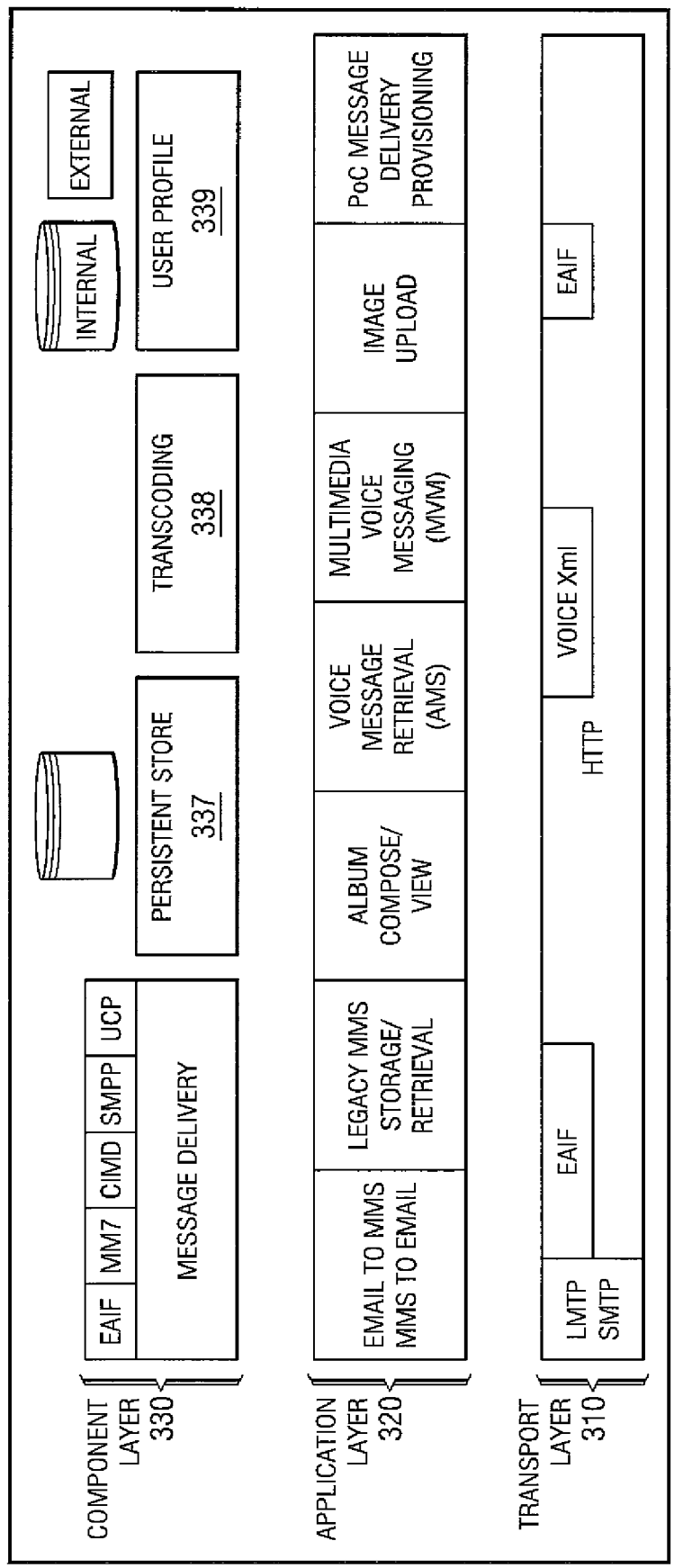
FIG. 3 depicts a block diagram of an exemplary architecture for an application bridge in accordance with one embodiment of the present invention.

In accordance with certain embodiments of the present invention, a layered architecture is provided for the application bridge 140, as depicted in FIG. 3. A transport layer 310 is provided which includes a number of protocol components (e.g. adapters or gateways) via which applications can receive requests, respond to these requests, or originate requests. For example, in one embodiment, transport layer 310 may support SIP (TCP/UDP), Hypertext Transfer Protocol HTTP (TCP) MM7 (HTTP/TCP), Simple Mail Transfer Protocol SMTP (TCP), and/or Local Mail Transfer Protocol LMTP (TCP/IP). The transport layer 310 is both modular and extensible for adding/modifying protocols as well as being independent of the application making use of the transport. In some embodiments, network bridge 130 may not be utilized, present, or may be redundant, as transport layer 310 contains substantially similar functionality.

Above the transport layer is an application layer 320, which comprises application logic that determines how communications should be presented to an end user. Multiple applications are supported within the application bridge 140, and these can make use of the transport and component layers to provide desired functionality. In one embodiment, for example, the application layer 320 may support applications including, but not limited to, converting email to MMS, and vice versa, storing and retrieving legacy MMS, composing and viewing albums, retrieving voice mails, multimedia voice messaging, uploading and downloading images, and enabling PoC (Push-to-talk Over Cellular) talk bursts to be delivered via alternative mechanisms, such as MMS, to non-PoC devices.

Above the application layer 320 is a component layer 330, which provides a set of services to the application layer 320. The set of components is extensible, and a few examples of components include a message delivery subsystem, a persistent store 337, a transcoding service, and a user profile repository. The message delivery subsystem may include, for example, EAIF (External Application Interface), MM7, CIMD (Computer Interface to Message Distribution), SMPP (Short Message Peer-to-Peer Protocol), and UCP (Universal Computer Protocol) components, etc. Persistence store 337 may store, for example, a picture, a complete multipart mail message, received communications, etc. In one embodiment, the message delivery component may make use of transport layer for actual protocol support.

The transcoding function allows the system to translate a data entity from one form to another. For example, transcoding function 338 may translate a .bmp file into a .jpeg file, or a .wav file into a 3gp file. The user profile function 339 contains information about the user, such as preferences, policies, and rules pertaining to the user.

As discussed above, application bridge 140 may implement one or more services. In conjunction with the implementation of these services application bridge 140 may receive one or more communications through router 200 (for example, when network bridge 130 is being used as a transport layer in conjunction with application bridge 140), where the communication is associated with a particular transport layer protocol or application. Based on a criteria associated with the destination of the communication (which may be obtained e.g. from user profile function 339), the service applied by application bridge 140 to the communication may generate a new set of communications based on applying application logic of application layer 320 to the communication or adapting the protocol of the communication using transport layer 310. It will be noted that in certain cases to apply the logic of application layer 140 to a communication it may be desired to assemble a group of affiliated communications and apply the logic of application layer 140 to the group of communication in order to form the new set of communications. For example, data associated with a certain application (such as an email) may be split over many individual communications (e.g. packets or the like). Thus, a single communication/interaction in domain 110 may result in multiple communications/interactions with domain 120, and vice versa. For example, receiving PoC talk burst from domain 10 may result in saving audio content in a persistent store, sending a SMS as a notification to domain 120, then accepting a call from device in 120 before playing the audio content, retrieved from persistent store, to device in domain 120.

Figure 4:
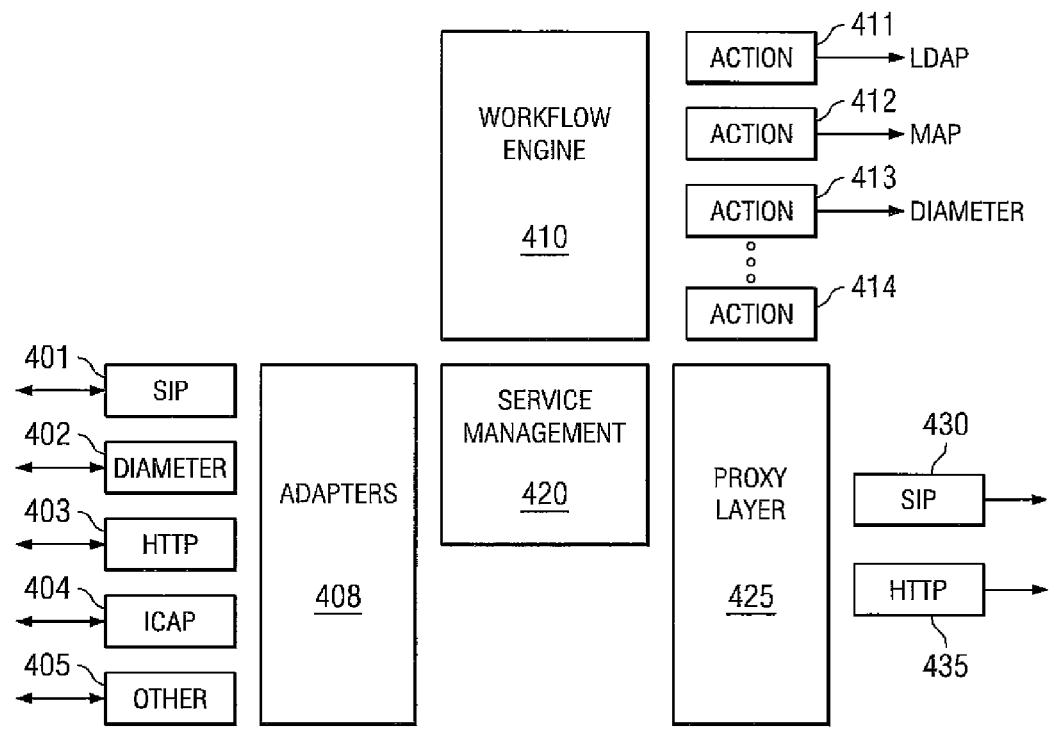
FIG. 4 depicts a block diagram of an exemplary billing bridge in accordance with one embodiment of the present invention.

Turning now to FIG. 4, one embodiment of an exemplary architecture for a billing bridge is depicted. The billing bridge 150 provides a means to extend the billing, monitoring, and provisioning services (e.g., the business logic) into a domain. This allows the service provider to manage costs and service provisioning associated with providing services to subscribers outside the normal service domain. More specifically, in one embodiment, billing bridge may implement one or more service where the application of the service may entail the invocation of one or more workflows. The billing bridge 150 may have an architecture which allows the addition of plug-in modules to enable service workflows to access external systems and perform the necessary actions required when intermediating access to a service or content. The billing bridge 150 has the ability to act in either agent mode (e.g., request/response) or as an intermediate proxy between a subscriber and content.

In the example shown in FIG. 4, the billing bridge 150 is accessible via a number of channels/protocols, including IMS Service Control ISC (SIP) 401 and Ro (Diameter) 402 for use from the IMS domain, plus ICAP (Internet Content Adapter Protocol) 403, HTTP 404, and other protocols from a domain. The billing bridge 150 has a flexible workflow engine 410 such that the MNO can define on a per service basis the charging and other policy actions desired.

The workflow engine 410 receives or otherwise obtains input parameters, which may be associated with a particular communication, and applies generalized business rules (i.e., application logic) found in workflow engine 410, which then generates actions to execute to determine how the communication should be billed. Workflow engine 410 may use an intermediation architecture that inspects a communication received by the network bridge to determine if the communication should be delivered to the end user. Advantageously, workflow engine 410 enables billing bridge 150 to perform single-environment bridging (SMS-SMS, MMS-MMS, SIP-SIP) For example, in some situations, workflow engine 410 determines that the incoming communication is a SIP protocol and the end user can receive a SIP message, so the communication is forwarded to the end user and workflow engine 410 only executes a billing action. Workflow engine 410 also enables billing bridge 150 to be deployed in conjunction with network bridge 130, for example billing bridge 150 may be used to implement a service 218, 220, 222.

More specifically, the parameters associated with the communication act as variables that are set for each service (e.g. workflow associated with a service). Based on the parameters and rules, decisions to take various actions may be reached. The actions may include, for example, actions implemented as HTTP activities, SMS activities, and Java activities, etc. A Java activity may be predefined or custom code. In one embodiment, all or part of billing bridge 150 may be implemented in conjunction with a service such as services 218, 220, and 222 in FIG. 2.

Figure 5B:
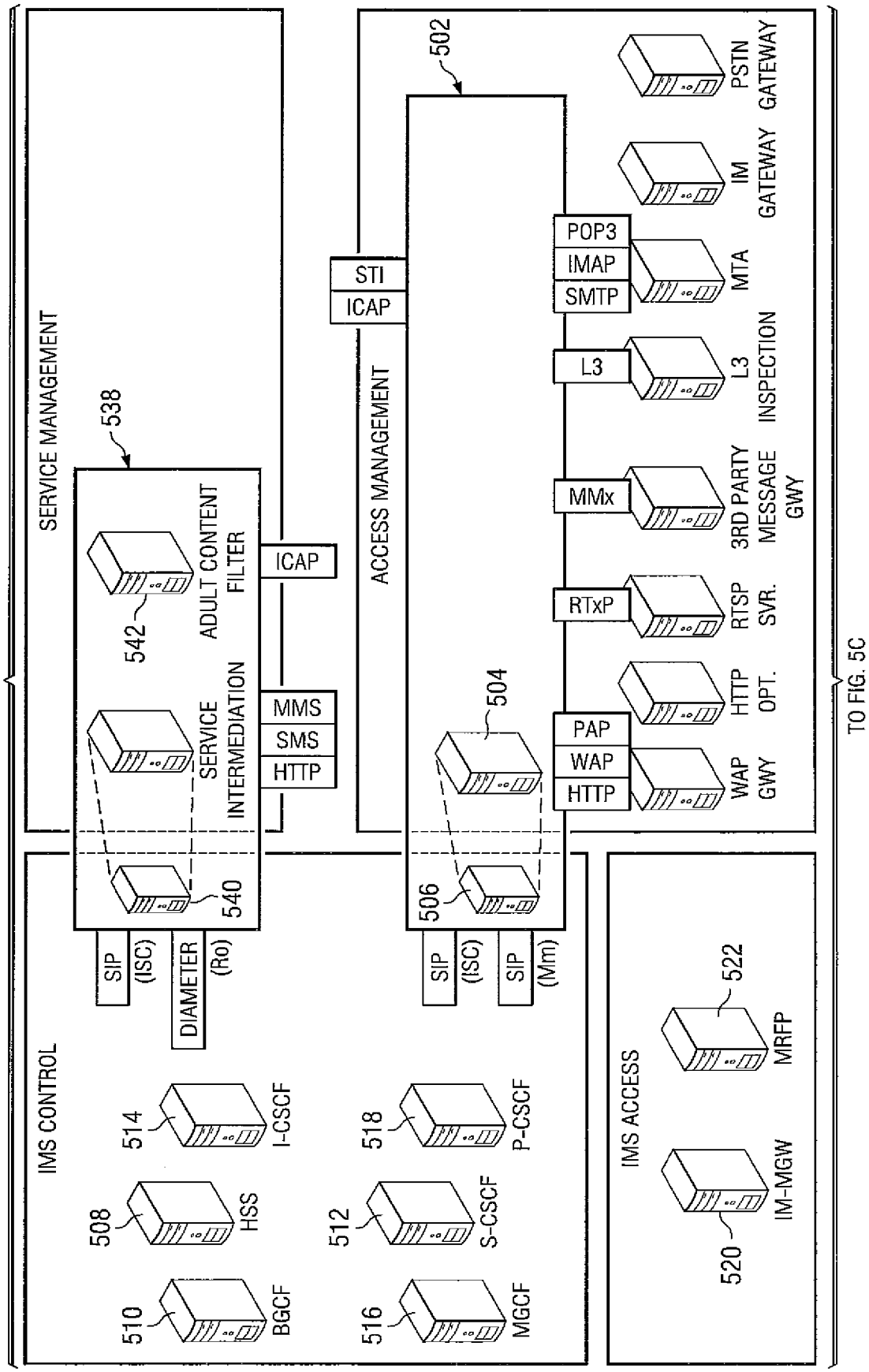

One example of how platforms may be positioned relative to a reference IMS domain to provide interoperability between an IMS domain and an IP-based services domain is depicted in FIGS. 5A-5C. A system for network interoperability provides Access Management, Service Management and Content Management and Services. A Common Access Layer includes network infrastructure such as that found in a cellular network, and which may be common to various types of networks. For example, the Common Access Layer may include a GSM (Globa System for Mobile Communications) cellular network, a CDMA (Code-Division Multiple Access) cellular network, a Wi-Fi® network, a WiMax network, a broadband network, a circuit-switched network or the Internet. The Common Access Layer may further include components such as SGSN (Serving GPRS Support Node)/GGSN (Gateway GPRS Support Node), PDSN (Packet Data Serving Node), and PSTN (e.g., SBC).

The network bridge 502 is used to allow interoperability between the IMS domain and the IP-based domain. The network bridge 502 comprises an access management server 504 which may appear as an I-CSCF 506 to the IMS domain, allowing non-IMS subscribers and services to appear to the IMS domain as IMS subscribers and services. It will be apparent that access management server 504 could also appear, for example, as an IBCF (Interconnection Border Control Function) or IMS-ALG (IMS Application Level Gateway) or the like. Network bridge 502 routes communications (e.g. requests and the like) from the IMS domain to the appropriate server in the IP-based domain that provides the required interoperability, performing any required translations en route. The IMS domain includes standard network elements such as HSS (Home Subscriber Server) 508, BGCF (Break out Gateway Control Function) 510, S-CSCF (Serving Call Session Control Function) 512, I-CSCF 514, MGCF (Media Gateway Control Function) 516, P-CSCF (Call Session Control Function) 518, IM-MGW (IMS Media Gateway) 520, MRFP (Multimedia Resource Function Processor) 522, PoC application server 524, IMM (Instant Multimedia Messaging) application server 526, and Presence application server 528.

Similarly, network bridge 502 comprises a plurality of protocol interfaces to support a set of protocols which may include MMS or other protocols allowing it to act as a third party message gateway and route communications to the appropriate service in either the IMS or IP-based domain. The protocol interfaces may include without limitation SIP, ICAP, STI (Standard Transcoding Interface), HTTP, WAP, PAP, POP3, IMAP (Internet Mail Access Protocol), SMTP, MMx, L3, and RTxP.

Thus, in one embodiment a role of the network bridge 502 is to act as an access management server supporting the protocols required to interoperate with the access protocol used to access or support a service. Network bridge 502 may support multiple protocols including these utilized by network domains/technology with which network bridge 502 used, such as SIP for an IMS network domains, MM1, MM4 and MM7 used for MMS based services, etc.

In one embodiment, application bridge 530 appears as a SIP application server 532 to the IMS domain. As such, application bridge 530 interoperates with subscribers/services in the IMS network either directly or indirectly via the network bridge 502. Application bridge 530 supports MMS and other protocols, allowing it to deliver services to and receive requests from non-IMS users/services via MMSC (Multimedia Message Service Center) or other standard network elements. By supporting both IMS and non-IMS protocols, application bridge 530 enables services to be developed that allow interoperability between domains, reusing existing elements/capabilities in one or both domains.

Application bridge 530 may comprise messaging application 534 which may support, for example, HTTP, SMS, or voice. Application bridge 530 may further comprise presence network agent 536 which is capable of acting as a source of presence information for subscribers which do not provide presence information to IMS based presence server 528. Application bridge 530 can make use of presence information by being a Presence Watcher to determine where to route messages based on subscriber presence information.

Billing bridge 538 may appear as SIP application server 540 to IMS domain. Billing bridge 538 makes existing service management infrastructure, used for controlling and charging for access to value added services and content, accessible to the IMS network via the ISC or Ro interfaces. Billing bridge 538 may, for example, include adult content filter 542 which may perform parental control functions.

Figure 6:
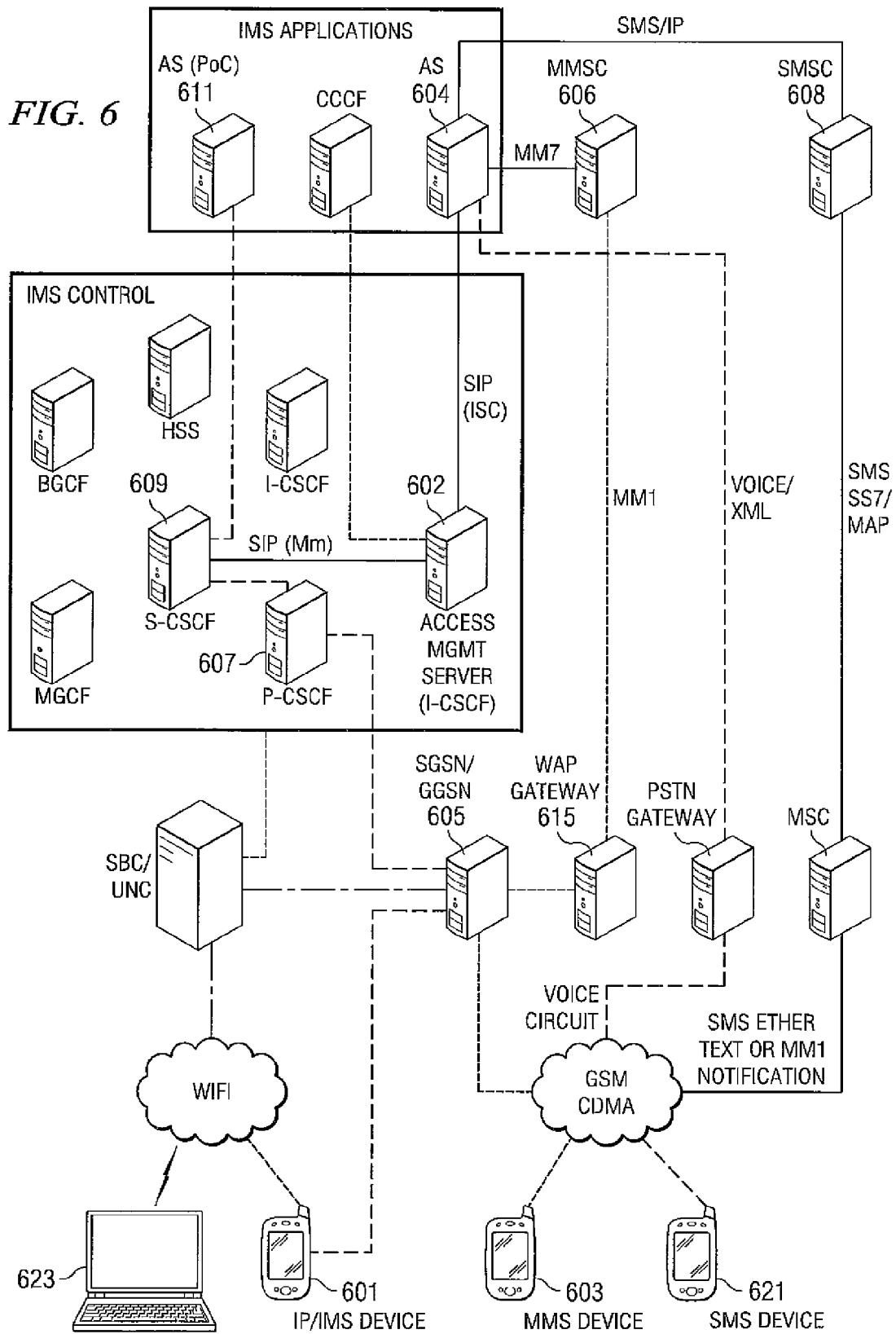
FIG. 6 depicts a process flow diagram of one embodiment of a system for interoperability.

Another example is provided to illustrate interoperability between an IMS network and one or more non-IMS networks, as depicted in FIG. 6. The present embodiment extends the reach of pre-IMS and IP/IMS messaging services back to a subscriber's communities or legacy devices through SMS, MMS, IM, email, and voice. For example, the application suite can extend the reach of the IMS Push-to-talk over Cellular (PoC) to SMS, MMS, IM, email and voice.

In the example depicted, network bridge 130 comprises access management server 602 which may appears as an I-CSCF to the IMS domain, allowing non-IMS subscribers and services to appear to the IMS domain as IMS subscribers and services. As stated above, network bridge 130 may also appear as, for example, an IBCF or IMSALG. Network bridge 130 routes requests from the IMS domain to the appropriate server in the legacy domain that provides the required interoperability, performing any required translations en route.

Application bridge 140 comprises application server 604 which supports MMS, SMS/IP, Voice/XML, and other protocols, allowing it to deliver services to and receive requests from non-IMS users/services via MMSC 606, SMSC (Short Message Service Center) 608 and other standard network elements. By supporting both IMS and non-IMS protocols, application bridge 140 enables services to be developed that allow interoperability between the new and existing domains, reusing existing elements/capabilities in both domains.

In the example of FIG. 6, a client with IP/IMS device 601 is trying to communicate with a client of MMS device 603. IP/IMS device 601 sends a request to initiate a push-to-talk session through network element, which may be, for example, a SGSN/GGSN server. The request is forwarded through proxy server (P-CSCF) 607, through service server (S-CSCF) 609 to PoC Application Server 611. In this example, the IMS architecture wants to find the PoC server for a subscriber with MMS device 603 but in the absence of this invention would be unable to find one because MMS device 603 is not an IMS and PoC enabled handset. However, Access Management Server (I-CSCF) 602, playing the role of network bridge, accepts messages (such as talk PoC invitations and talk bursts) from IMS applications as if MMS device 603 has PoC capability. The message may be forwarded using different protocols depending on the situation. For example, the message can be sent as a audio file using MMS protocol to MNO MMSC server 606. From the MMSC standpoint, embodiments of the present invention would appear to be just another MMSC. The talk burst, appearing as a multi-media file, is then transmitted to WAP gateway 615, through SGSN/GGSN network element 605 to MMS device 603. Similarly, IP/IMS device 601 may use embodiments of the present invention to communicate with SMS device 621 or laptop 623.

The message generated by PoC Application Server 611 can be sent directly from Application Server (AS) 604 (playing the role of application bridge 140) because Application Server 604 contains some or all of the network bridge functionality and can, as in this example) send the message directly. Alternatively, Application Server 604 may package the talk bursts and send them to Access Management Server (I-CSCF) 602, which routes the messages accordingly.

Figure 7:
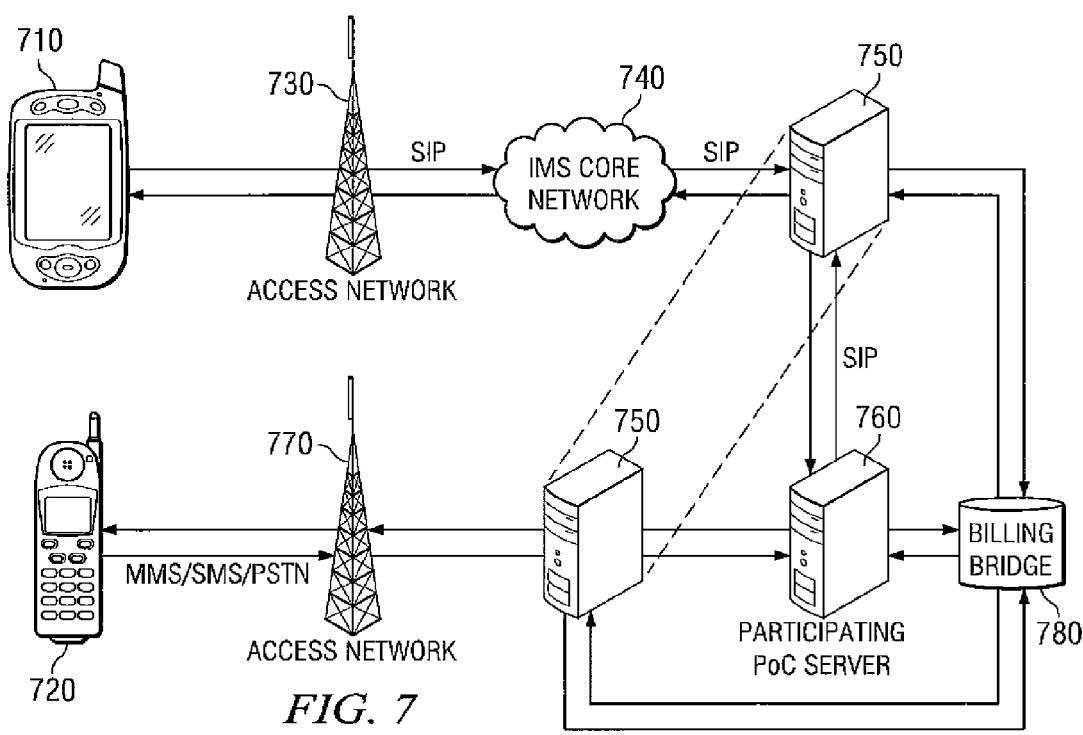
FIG. 7 depicts a block diagram for illustrating one embodiment of a system for interoperability.

Reference is now made to FIG. 7, which depicts a diagram for illustrating an exemplary embodiment of the present invention that enables the extension of PoC service from an IMS network to subscribers in a non-IMS network. PoC allows a mobile phone to effectively function as a walkie-talkie. A PoC user may connect via a dedicated button. No dialing phone number is needed. A message is sent and played back via the recipient's speaker. Half-duplex technology is typically provided. PoC is advantageous to end-users by providing quick connect times, cheaper cost (single handset), group talking, simplicity of use, and expanded range (as compared to a walkie-talkie). PoC is advantageous to operators by attracting new users, providing a new voice service, encouraging multiple participants to take up the service, providing efficient use of network resources, and utilizing existing cell towers, with greater distance coverage. However, PoC is traditionally available only to PoC subscribers with PoC-enabled devices.

In the example of FIG. 7, however, embodiments of the present invention may be utilized to communicate between an IMS device on an IMS network with a non-IMS enabled device on a non-IMS network. Suppose an IMS subscriber (Jane) requests a PoC session with a non-IMS subscriber (Carlos). Jane's cell phone 710 has PoC capability, while Carlos' cell phone 720 does not. Carlos' cell phone 720 is, however, capable of handling SMS messages.

A SIP message is sent from Jane's cell phone 710 via a wireless access network 730, to which Jane subscribes, and IMS core network 740. IMS core network 740 includes Controlling PoC server to which Jane's request is sent. The Controlling PoC server forwards an invitation to Carlos which is routed to access management server 750 (which includes a network bridge as discussed above). Access management server 750 forwards the request to the appropriate support server 760 (which includes application bridge 140 as discussed above). Support server 760 forwards an SMS message to Carlos' cell phone 720 via access management server 750 and wireless access network 770 to which Carlos subscribes. The message may be displayed on Carlos' phone 720, for example, as a message instructing Carlos on how to participate in the session. For example, the message may comprise an SMS message which reads as follows: "Jane wants to connect with you via push to talk. To talk dial 123." As another example, if Carlos' cell phone 720 is an MMS-capable device, the message may comprise a MMS message which announces as follows: "Jane wants to connect with you via push to talk," and Carlos may listen and reply with AMS (Audio Messaging Service). As yet another example, the message sent to Carlos may be a voice signal formatted according to a PSTN protocol.

Carlos' response, whether SMS, AMS, or other format, is sent from Carlos' cell phone 720 via Carlos' access network 770, access management server 750, and support server 760. Access management server 750 then formats a SIP message or RTP based Talk Burst and sends it to Jane's cell phone 710 via access management server 750, IMS core network 740, and Jane's access network 730.

In accordance with some embodiments, billing bridge 780 may be used to further control access and manage charges for value-added or premium services. Although billing bridge 780 is depicted as a database, billing bridge 780 may be implemented as software or hardware or both. Billing bridge 780 has the ability to act in either agent mode or as an intermediate proxy between the subscriber and the content as discussed above. Billing bridge 780 may include a flexible workflow engine such that an MNO (Mobile Network Operator) can define on a per service basis the charging and other policy actions required. Billing bridge 780 provides a means to extend the billing, monitoring, and provisioning services (e.g., the business logic) into the new domain, This allows the service provider to manage costs and service provisioning associated with providing services to subscribers outside the normal service domain.

Thus, it can be seen that the PoC service is effectively deployed as an application in the non-IMS domain, whereas prior to the present invention, IMS services could only be used by registered IMS subscribers. From the perspectives of the IMS subscribers and the non-IMS subscribers, it appears as if they are communicating within the same network rather than separate, different networks. The interoperability is transparent to the subscribers as well as the network operators.

Reference is now made to FIG. 8, which depicts an exemplary process flow for billing management in connection with the example of FIG. 7. As in FIG. 7, Jane (sender) is a PoC user who is attempting to reach Carlos (recipient), who is not a PoC user. In the present example, Jane is a pre-paid user, while Carlos pays for messages as he goes. In addition, Carlos' subscriber policy provides that he cannot receive messages unless he is age 18 or over, and has opted in to receiving unsolicited messages. Jane sends a message and is billed; the policy is set so that Carlos can get the message and play it. Jane is not charged for the delivery announcement.

Process flow begins at 800 with Jane's cell phone 801 requesting a PoC session with Carlos, and therefore, a bridged service is detected. In step 802, it is determined that Jane's billing model is pre-paid PoC, and Carlos' billing model is pay-per-MMS. An inquiry is made at 804 as to whether Jane has valid funds in her account. If there are not valid funds, then Jane is notified of the charge (by way of an SMS, for example), and Jane may be given an opportunity to add funds at step 805. If there are valid funds, the delivery policy is determined in step 806. An inquiry is made at 808 as to whether Carlos has opted in to receive unsolicited messages, and whether he is age 18 or over. If the conditions are not satisfied, then a policy of no delivery is set in the application bridge at step 807. If the conditions are satisfied, then the policy Is set to send a message to Carlos at step 810. Funds are decremented from Jane's account in step 812. The delivery status is determined from the application bridge in step 814. A notification of successful delivery is made, without charging Jane in step 816. Process flow ends at 818.

In accordance with embodiments of the present embodiment, non-IMS subscribers appear as if they are IMS subscribers in a remote or foreign IMS domain. The IMS network and PoC service allow for interoperability with such IMS subscribers by routing requests to the IMS domain via an I-CSCF. Embodiments of the network bridge of the present invention appears to the IMS domain as an I-CSCF, allowing the new PoC service to use its standard defined interworking capabilities but reach the application bridge providing the PoC interoperability service to the legacy non-IMS subscribers. Those skilled in the art will appreciate that the present invention is not limited to this technique, and various embodiments may act as an Application server in the role of a Participating Server in a home domain if more appropriate to the MNO, and the I-CSCF approach is just one approach to make users appear as PoC users on a different participating PoC server.

In accordance with certain embodiments of the present invention, subscriber identity management may also be provided. This provides a means to allow mobile and fixed services to interact with users of existing clients in a seamless manner by ensuring the user's identity that is presented is in context to the client and application that the recipient is using. It also allows originators to identity recipients using an address in context to the originating client and not the receiving client, which may not be known at the point of origination, used to receive the communication.

Figure 9A:
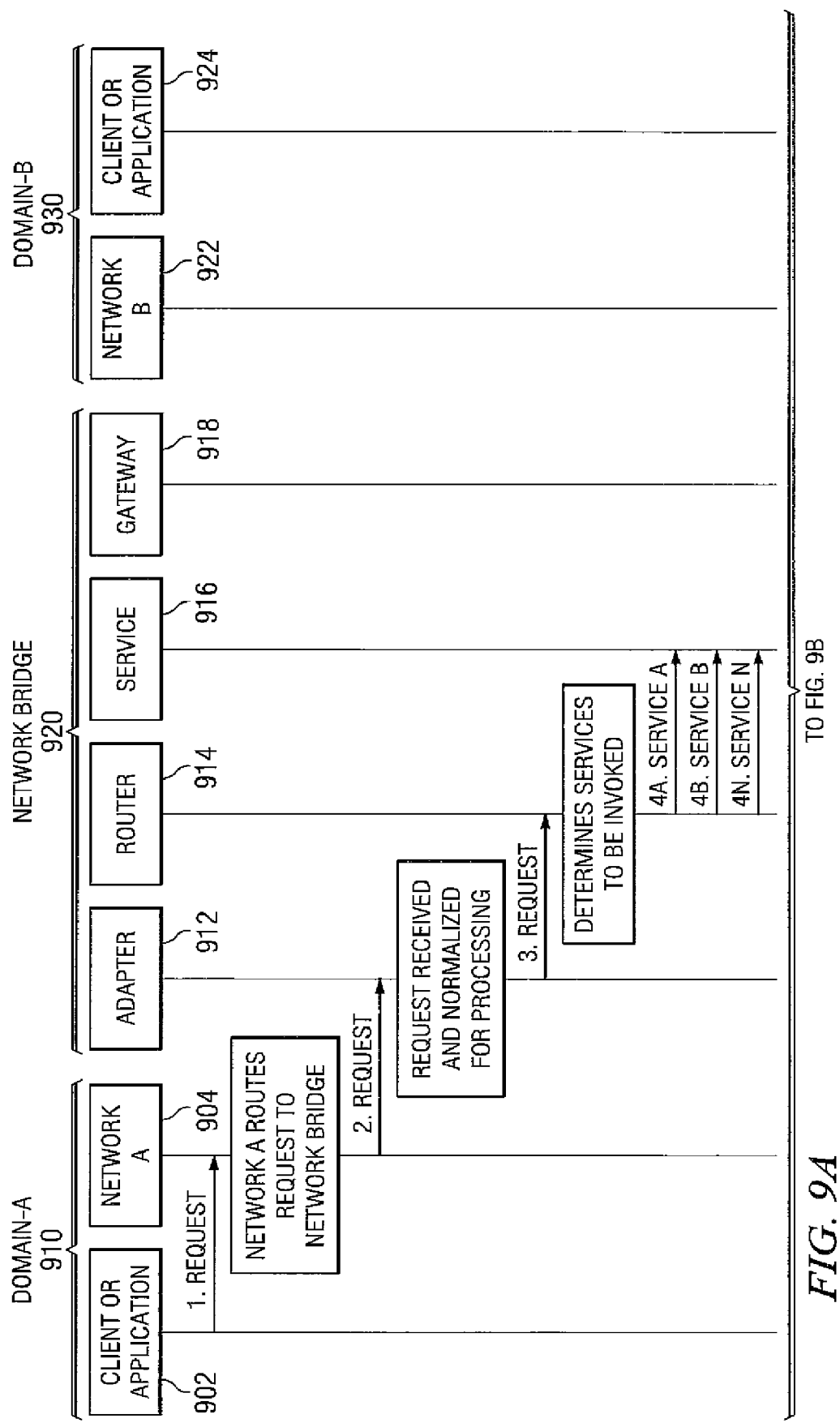
FIGS. 9A and 9B depict a flow diagram of a generic flow for the network bridge.
Figure 9B:
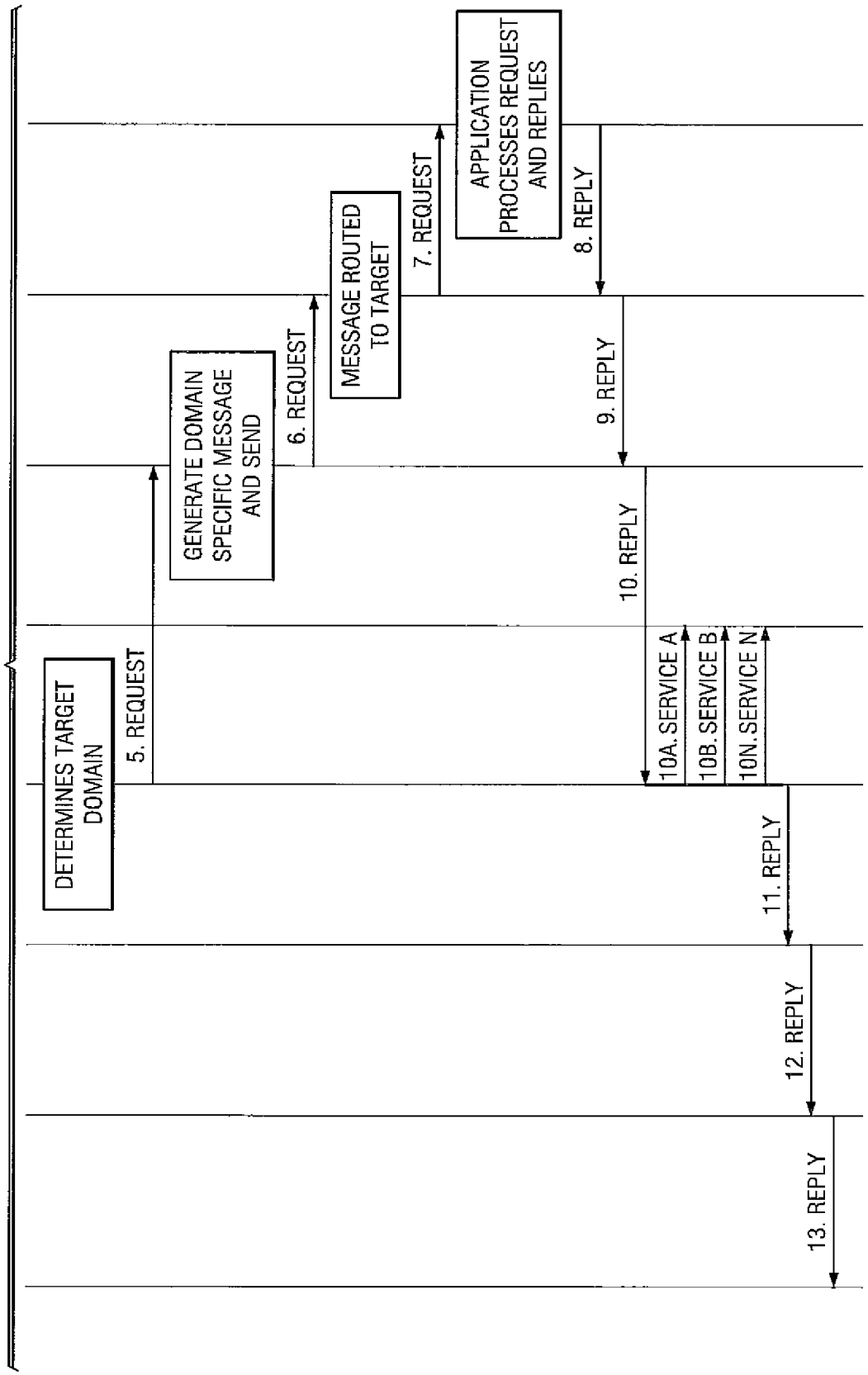

FIGS. 9A and 9B represent a flow diagram of one embodiment of a generic flow for the network bridge. Embodiments of the present invention appear as standard elements to different domains, which advantageously allows requests to be routed between clients and applications in the various domains using standard equipment and procedures for that domain.

Figure 10A:
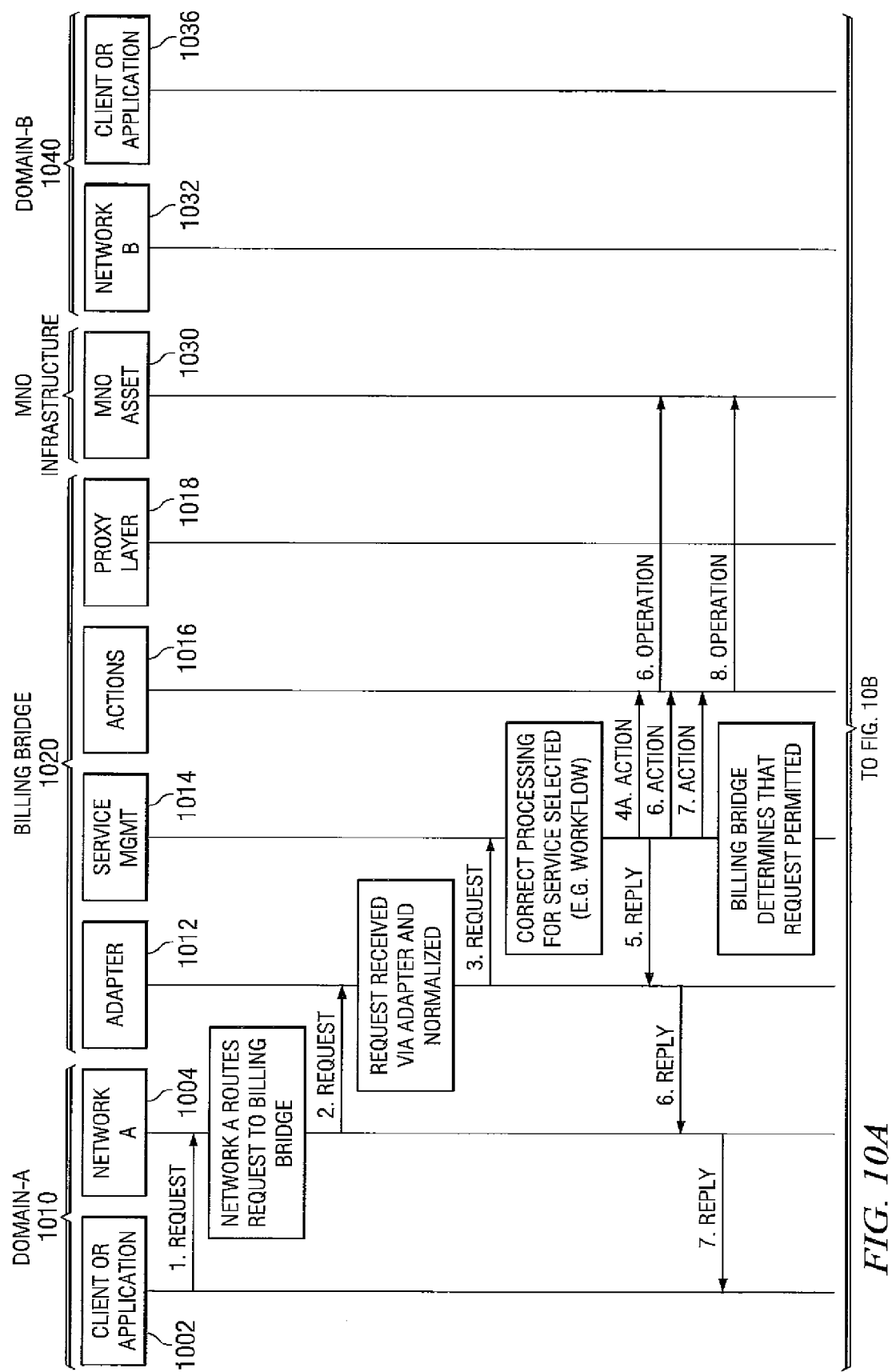
Figure 10B:
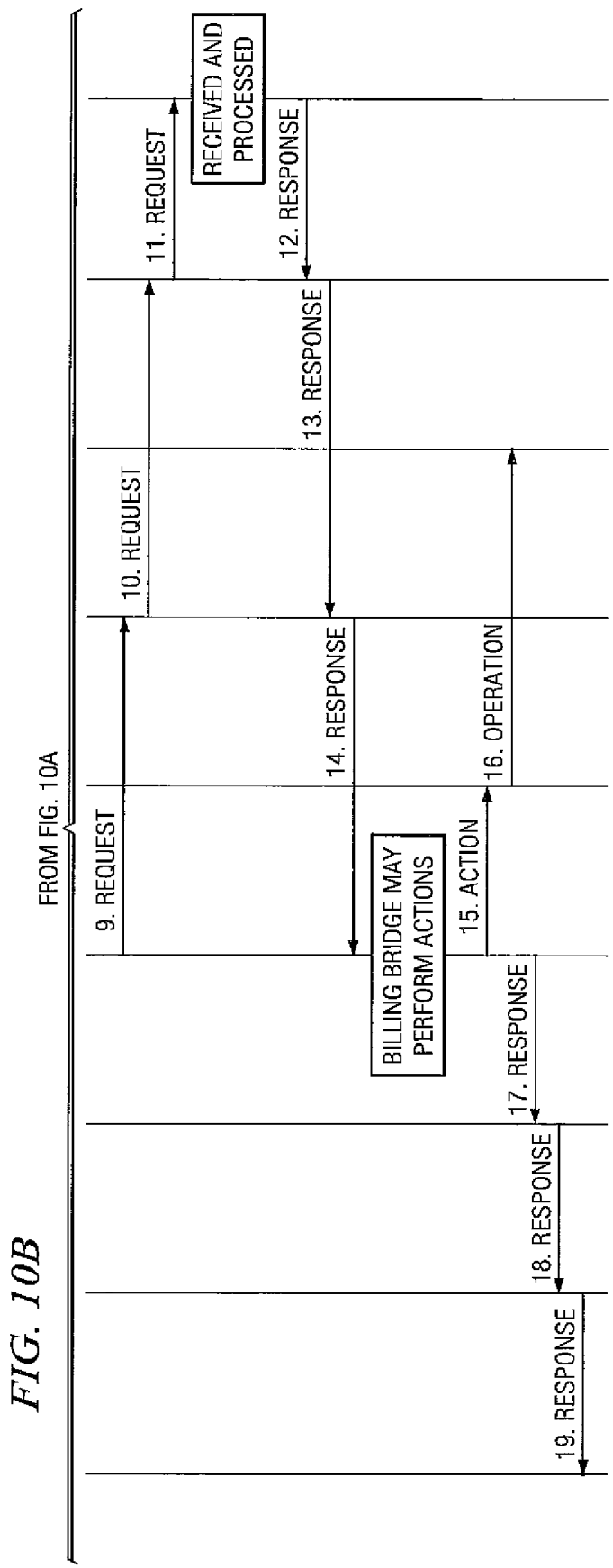

In this embodiment, a client or application 902 in Domain A 910 sends a request to client/application in Domain B, by initiating a request into Network A 904. Network A 904 routes the request to the Network Bridge 920 as if the Network Bridge 920 were a standard element in Domain A 910. Once received into Network Bridge 920, the request is normalized by adapter 912 and sent to router 914, which determines which, if any services should be applied. If one or more services (e.g., authentication, virus checking, premium content) are needed, router 914 then causes Service 916 to be performed to the request and then determines the target domain, which in this example is Domain B 1930. In this example, router 914 passes the request to an appropriate gateway 918 for Domain B 1930, and gateway 918 generates a request valid for Domain B 1930 and initiates this into Network B 922 for delivery to the desired recipient on Network B 922. Advantageously, the request received by Domain B 1930 appears as if it was generated by a native client/application and Network B 922 is able to forward the request using standard equipment and procedures. The request received by client/application (Client B) 924 requires no special handling or knowledge that the request was generated by Domain A 910, and Client B 924 is able to process the request and reply. Those skilled in the art will appreciate that in some embodiments the protocols are two-way and hence a response commonly referred to as an "in band" ACK, can come back to Client A through the gateway 918 as shown, and a subsequent independent request from Domain B 1930 would come back via adapter 912. FIGS. 10 and 10B illustrate an embodiment of a generalized flow involving billing bridge 1020 according to one embodiment of the present invention. In this embodiment, billing bridge 1020 connects to both client networks and applications/services, thus billing bridge 1020 is advantageously intermediate to both user and application/service initiated requests.

In FIG. 10, a request generated by Client A 1002 and passed to Network A 1004 in Domain A 1010 is forwarded to Billing Bridge 1020. Adapter 1012 receives and normalizes the request and passes the request to Service Management Application 1014 for processing. Service Management Application 1014 uses logic (e.g. a workflow as described above) to perform the billing that is independent of the protocol/application, and its multiple adapters enable it to appear as standard part of different networks (e.g., IMS, SMS, MMS, HTTP, WAP, etc.). Service Management Application 1014 determines what, if any, actions need to be applied to the request. For example, Service Management Application 1014 may determine that Client A 1002 is a pay-as-you-go client and funds must be decremented, so a reply is generated and sent notifying Client A 1002 that funds have been decremented. Service Management Application 1014 may also request more information from Client A. For example, if Service Management Application 1014 determines that Client A 1002 does not have enough funds to pay for the requested service, Service Management Application 1014 may reply and ask if Client A 1014 wants to add funds to the Client A account Additionally, Service Management Application 1014 may determine that information or permission is needed from MNO Asset 1030, or one or more actions generated by Service Management Application 1014 may determine that more information or permission is needed from MNO asset 1030 and thus communicates with MNO asset 1030. Once Service Management Application 1014 in Billing Bridge 1020 determines that the request should be permitted, the request is forwarded to gateway 1018, which appears like a proxy layer to network elements in Domain B 1040. Gateway 1018 forwards a request valid for Domain B 1040 to Network B 1032 in Domain B 1040 (which may or may not be the same network or domain as Domain A 1010). Depending on the applications and protocols used, there may be a response from Client B 1036 that must flow through Billing Bridge 1020 such that Service Management Application 1014 implements on or more actions (as shown) and/or contacts MNO asset 1030 (as shown) before the response is sent to Client A 1002. Alternatively, if there are no further billing actions, the request/response may bypass billing bridge 1020.

Figure 11A:
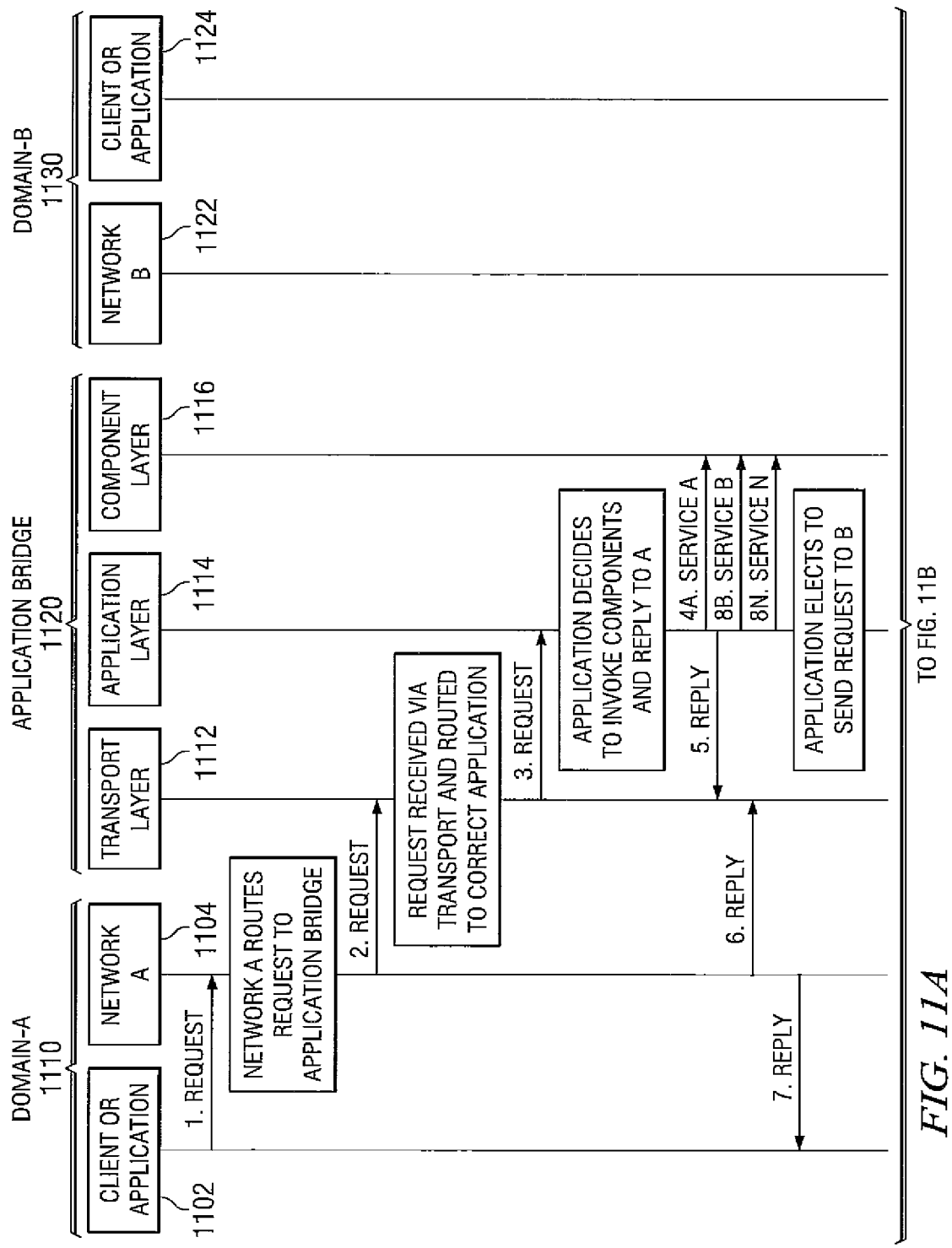

FIGS. 11A and 11B depict a diagram illustrating generic processing flow that may occur at the Application Bridge in accordance with one embodiment of the present invention. When Client A 1102 generates a request, Network A 1404 in Domain A 1110 routes the request to the Application Bridge 1120. The request is received by the Transport Layer 1112, where it is normalized and routed to the correct application in application layer 1414. Alternatively, in some embodiments, network bridge 130 routes the normalized request to the application layer 1414. One or more applications in Application layer 1414 determine whether to invoke one or more components from Component Layer 1116, and may optionally reply to Client A 1102. Once Application layer 1414 decides to send a request to Client B 1130, a request valid for Network B 1122 is generated by application layer 1414. This request is not a translated version of the request received at application layer 1414. It is a new request generated by application layer 1414 based on rules, preferences, and policies to provide a desired application to Client B. When Network B 1122 receives the request, the Application Bridge 1120 appears as an element in Network B 1122, and the request appears as if an application/protocol within Domain B 1130 generated it, so Network B 1122 needs no new equipment or protocol to forward the request to Client B 1124. Client B 1124 receives the request and processes it according to standard protocol in Domain B 1130, and can send a request depending on how Application Bridge 1120 emulated services to Domain B 1130.

Figure 12:
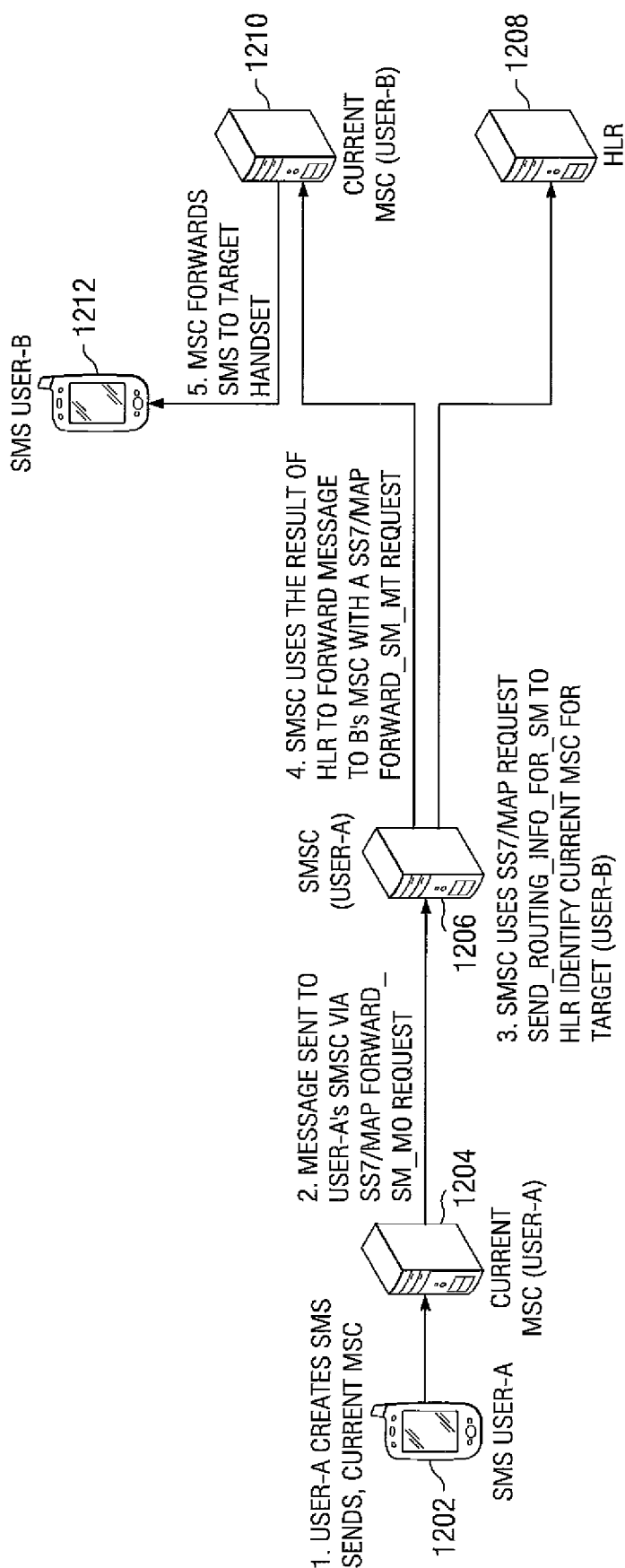
FIG. 12 depicts a flow diagram for delivering a SMS message to a user in a GSM network in accordance with normal GSM SMS procedures.

FIG. 12 shows one exemplary method for SMS submission and delivery based on Global System for Mobile Communication (GSM) technology, which routes messages between SMS users using an international telecommunication standard Signaling System 7 (SS7) based protocol. Those skilled in the art will appreciate that the IS-41 technology and other network technologies have similar functionality to GSM.

In some embodiments, SMS User-A 1202 creates an SMS message and sends the message through the tower and base station to current Message Switching Center (MSC) 1204. Those skilled in the art will appreciate that message submission and delivery may similarly proceed via an SGSN (Serving GPRS Support Node) (not shown), without departing in scope from the present disclosure. MSC 1204 receives the message along with network address of user-A's SMSC, MSC 1204 forwards the SMS message to User-A's Short Messaging Service Center (SMSC) 1206 using SS7/MAP MO_FORWARD_SM_MO. SMSC 1206 for User-A sends a SS7/MAP request SEND_ROUTING_INFO_FOR_SHORT_MESSAGE (SRIforSM, or SRI_For_SM) to Home Location Register (HLR) 1208 to get address information for User-B's current MSC (User-B is on a mobile phone and therefore may be switching MSC's as is known in the art). Each user is assigned to only one HLR, and each HLR is affiliated with one network. Once HLR 1208 for User-B 1212 performs a SRI_For_SM for User-B, the information is returned to SMSC 1206 for User-A 1202. SMSC 1206 for User-A 1202 uses the result of the HLR request to forward the message to Current MSC 1210 for User-B 1212. Similarly to Current MSC 1204 for User-A, Current MSC 1210 for User-B changes dynamically to enable User-B to move around with a mobile phone. MSC 1210 for User-B 1212 forwards the message to User-B 1212 using SS7 routing and User-B's MSISDN. In this scenario, all communication between User-A and User-B is enabled by SS7 standard and the PLMN, and User-A and User-B are identified by their respective MSISDNs (e.g. mobile phone numbers).

Figure 13:
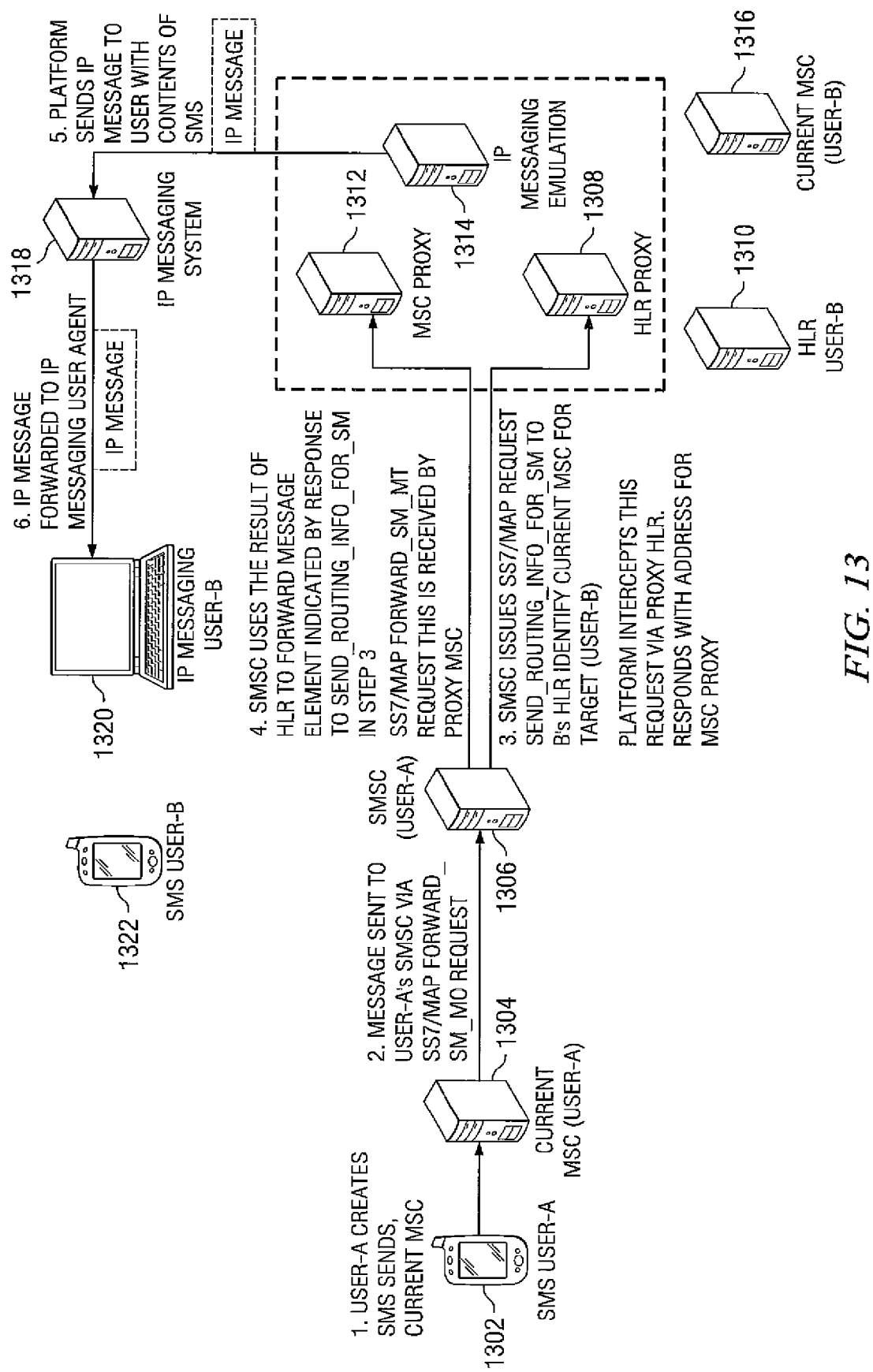
FIG. 13 depicts a schematic diagram of one embodiment of a how a SMS message may be delivered from user in a SMS domain to a user in an IP domain.

FIG. 13 depicts a schematic diagram of one embodiment of a call flow for seamless delivery of a SMS message to a user in an IP messaging domain. Examples of IP messaging domains include IMS Messaging, OMA Instant Messaging, Enterprise Instant Messaging such as Microsoft® Live Communication Server 2005 or Office Communicator Server 2007, consumer Instant Messaging such as Yahoo!®, Windows Live/MSN® or AOL®, or email. In this call flow, elements in the SMS domain perform the same functions they normally perform. In particular, SMS User-A 1302 creates and sends a SMS message to the Current MSC 1304 for SMS User-A 1302 using the same functionality described in FIG. 12. Similarly, current MSC for User-A 1304 forwards the SMS message to User-A's SMSC 1306 via SS7/MAP MO_FORWARD_SM request. User-A's SMSC 1306 issues a SS7/MAP request SEND_ROUTING_INFO_FOR_SM to get identification of the current MSC 1316 for SMS User-B 1422. Advantageously, these steps follow the normal procedures for User-A's handset 1302, current MSC 1304, and SMSC 1306. Thus, the domain in which User-A's handset 1302, current MSC 1304 and SMSC 1306 reside may use existing technology.

When USER-A's SMSC 1306 issues the SRI_FOR_SM request, HLR Proxy 1308 located in the platform of the present invention may intercept the request before the request reaches User-B's HLR 1310.

It should be noted that embodiments of the present invention intercept messages similar to how SPAM filters intercept messages. However, SPAM filters are used to prevent messages from reaching a user. Embodiments of the present invention may intercept messages to enable the present invention to route messages using a communication protocol such that messages can be delivered that ordinarily might not be delivered. (SPAM filters and a method for implementation are generally described in "SMS and MMS Interworking in Mobile Networks," (Henry-Labordere, Arnaud and Jonack, Vincent, Artech House, Inc., 2004, ISBN 1-58053-890-8).)

HLR Proxy may then respond to the request with a different address. In some embodiments, the address information returned by HLR Proxy 1308 in response to the SRI_For_SM request to the SMSC 1306 may not be the identity of User-B's current MSC 1316, but may instead be the identity of MSC Proxy 1312 located in the platform of the present invention. When SMSC 1306 receives the address information from HLR Proxy 1308, SMSC 1306 uses a SS7/MAP MT_FORWARD_SM request to forward the SMS message based on the address received in the response, as such the SMS message is forwarded to MSC Proxy 1312 instead of forwarding the SMS message to User-B's current MSC 1316. MSC Proxy 1312 may also be referred to as MSC Emulator 1312, and HLR Proxy 1308 may also be referred to as HLR Emulator 1308.

Once an SMS message is received by embodiments of the platform of the present invention, the message may be normalized into a network-independent format, have one or more services applied to the message, and generate a second communication based on the original message into an appropriate form for an IP-based messaging system that will deliver the message. In one embodiment depicted by this flow diagram, generating a second communication may involve mapping the addresses from MSISDNs to a SIP URI or other appropriate address information. In some embodiments, generating a second communication may include transforming the text into a form appropriate to the IP messaging system. In some embodiments, MSC Proxy 1312 may contain network bridge 130. In some embodiments, MSC Proxy 1312 may generate a second communication by identifying routing information for the intended recipient of the SMS message. As an example, MSC Proxy 1312 may get routing information from user profile 339 depicted in FIG. 3 to determine one or more formats in which the SMS message may be sent to User-B. Based on policies or preferences or both, MSC Proxy 1312 may select a preferred format.

In one embodiment, MSC Proxy 1312 may send the SMS message in an IP format. In one embodiment depicted in FIG. 13, once the second communication has been generated into a form appropriate for the IP domain, IP messaging emulation 1314 sends the message (as an IP message with the contents of the original SMS message) to the IP messaging system 1318. IP messaging system 1318 forwards the IP message to IP Messaging User Agent 1320 for User-B, and not to SMS User-B's handset 1322. Thus, a person is able to send an SMS message from SMS User-A's handset 1302 in an SMS domain to IP Messaging User agent 1320 in an IP domain seamlessly. In some embodiments, a SMS message may be delivered to an IP user without modifying either domain.

Figure 14:
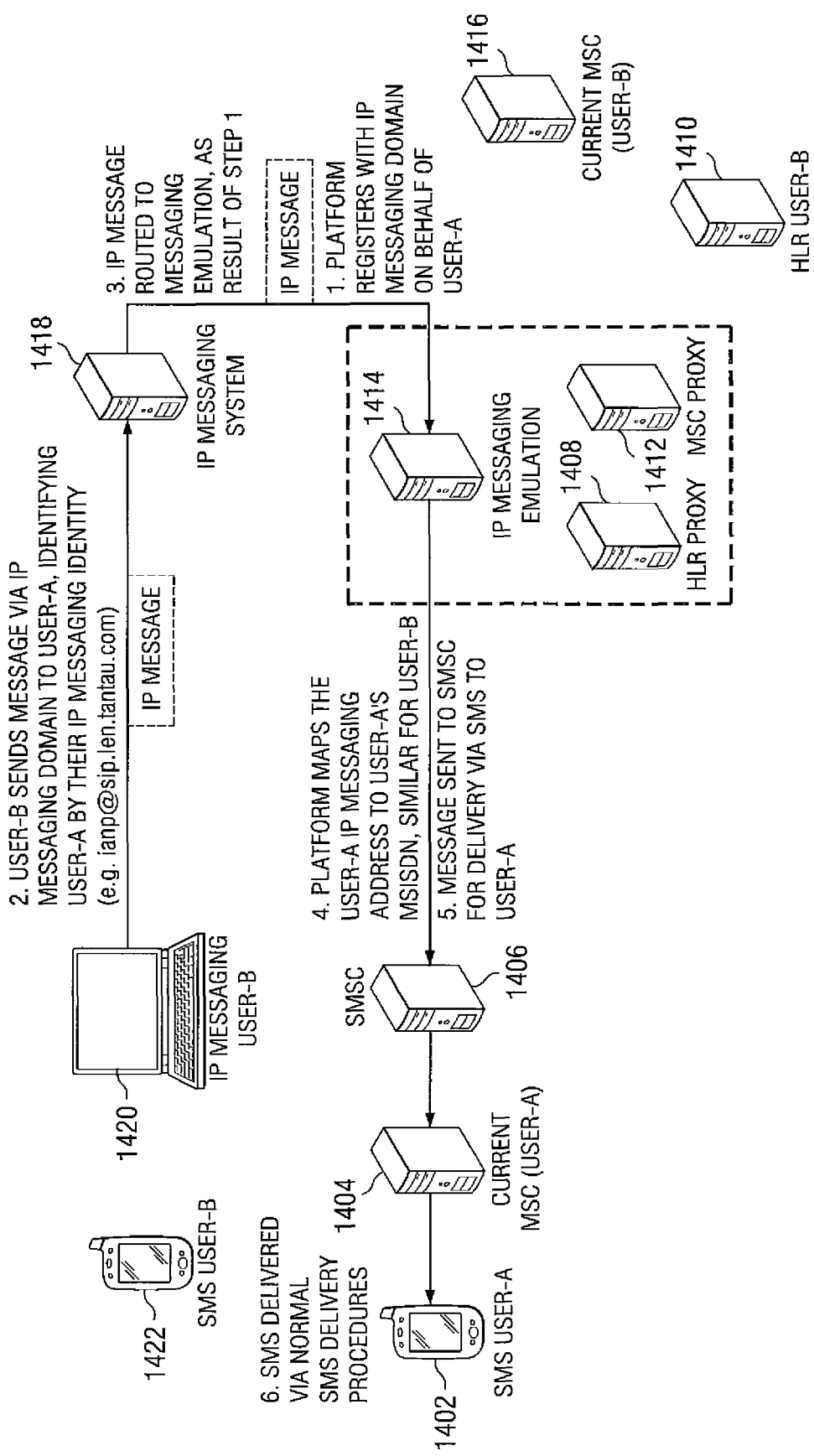
FIG. 14 depicts a schematic diagram of one embodiment of a how an IP message may be delivered from user in an IP domain to a user in a SMS domain.

FIG. 14 depicts a schematic diagram illustrating one embodiment of how messages may be sent from a user in an IP domain to a user in an SMS domain. In one embodiment the platform registers with the IP Messaging domain 1418 on behalf of SMS User-A 1402. In some embodiments, the platform registers with the IP Messaging domain only if presence information received from the IP messaging domain indicates User-A is not registered with the IP domain. User-B sends a message from laptop 1420 in an IP domain to User-A, identifying User-A by an IP messaging identity (e.g., ianp@sip.len.tantau.com) rather than User-A's MSISDN. In one embodiment the IP Message is routed by the IP domain to an IP Messaging Emulator 1414 as a result of the platform registering itself with the IP Messaging domain on behalf of SMS User-A 1402. In some embodiments, IP Messaging Emulator 1414 normalizes the message and/or routes the message based on information about User-A stored in a bridge (e.g., application bridge 140 or network bridge 130). In some embodiments, information about User-A may be stored in User Profile 339. In one embodiment, IP Messaging Emulator 1414 maps the messaging address for User-A 1402 to the MSISDN for User-A 1402.

In one embodiment, the platform may apply one or more services to the normalized message. In some embodiments, the platform generates a second communication based on the normalized message. In some embodiments, the second communication is a SMS message. In one embodiment, IP Messaging Emulator 1414 maps the messaging address for User-B 1420 to the MSISDN for User-B 1422 and sends the message to SMSC 1406.

In one embodiment, SMSC 1406 sends the message in SMS format, along with the MSISDNs for User-A 1402 and User-B 1422, to the current MSC 1404 for User-A 1402. Current MSC 1404 receives the message and knows how to deliver the message to the proper SMS recipient (i.e., SMS User-A 1402.) Current Message Switching Center (MSC) 1404 sends the SMS message through a base station and tower to SMS User-A 1402. SMS User-A 1402 receives the SMS message and the SMS message appears to SMS User-A 1402 along with the MSISDN for User-B 1422. Thus, embodiments of the platform are able to deliver messages from a user in an IP domain to a user in an SMS domain, and are able to map the identities of both users to MSISDNs to ensure the recipient's experience appears natural for the phone on which they receive the message.

Figure 15:
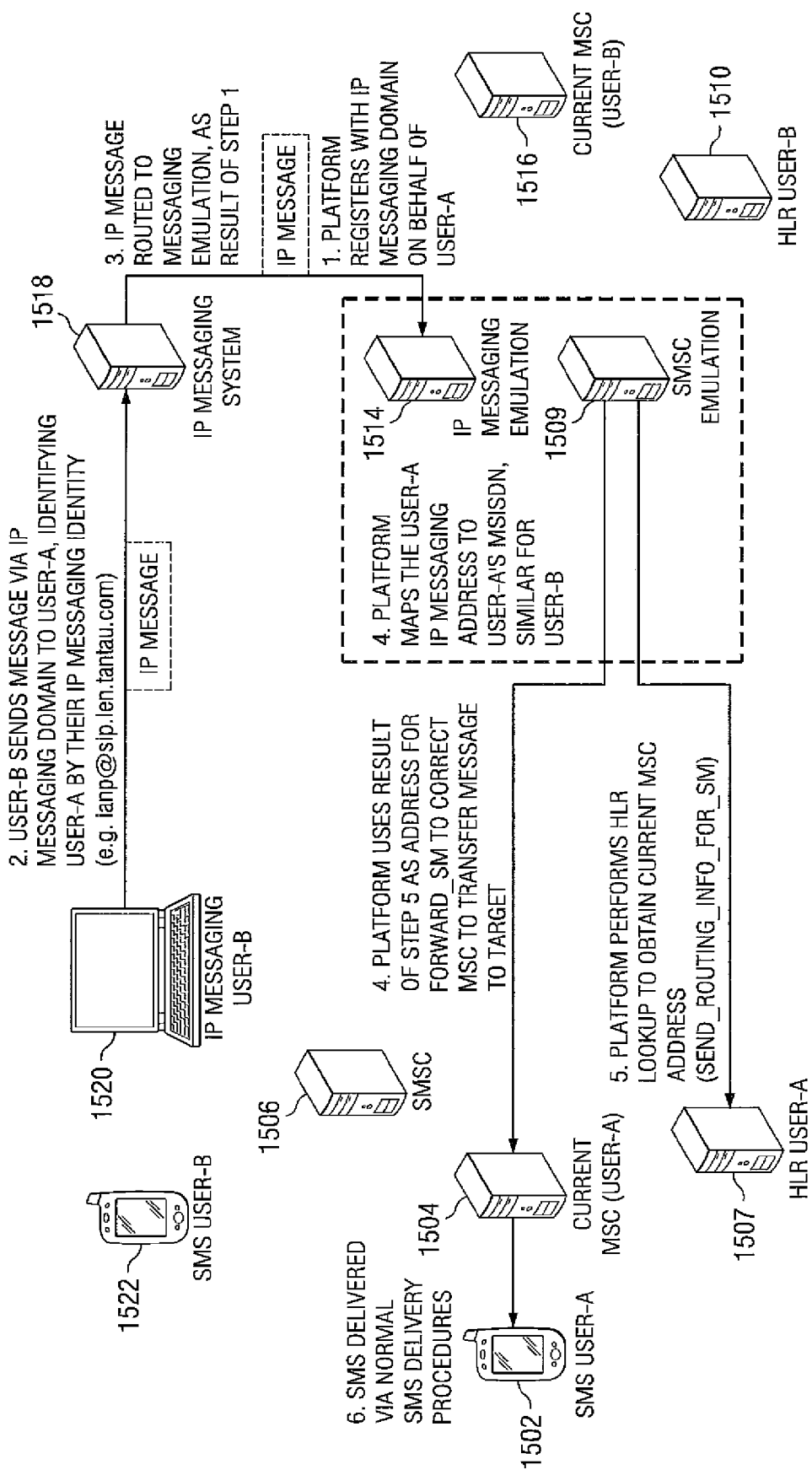
FIG. 15 depicts a schematic diagram of one embodiment of a how an IP message may be delivered from user in an IP domain to a user in a SMS domain.

In some embodiments, a message sent from an IP domain may be routed to a Message Switching Center (MSC) in a SMS domain directly. In one embodiment depicted in FIG. 15, the platform registers with an IP Messaging domain on behalf of User-A 1502. When User-B on laptop 1520 in an IP domain sends a message to User-A 1502, User-B 1520 may identify User-A by an IP messaging identity (e.g., ianp@sip.len.tantau.com). IP Messaging System 1518 routes the IP message to IP Messaging Emulator 1514 as a result of the platform registering with the IP Messaging domain on behalf of User-A 1502. In some embodiments, the IP-based message may be normalized into a network-independent format, have one or more services applied, and a second communication may be generated based on the message, policies and preferences into a SMS message.

In some embodiments, IP Messaging Emulator 1514 transforms the message and/or routes the message based on information about User-A 1502 stored in an application bridge such as application bridge 140 in FIG. 1. In some embodiments, information about User-A 1502 may be stored in a User Profile component such as User Profile 339 in FIG. 4. In one embodiment, IP Messaging Emulator 1514 maps the messaging address for User-A 1502 to the MSISDN for User-A 1502. In one embodiment, IP Messaging Emulator 1514 maps the messaging address for User-B 1520 to the MSISDN for User-B 1522. In one embodiment, SMSC Emulator 1510 performs a Home Location Register (HLR) lookup (e.g., sends a SEND_ROUTING_INFO_FOR_SM request to HLR 1508 for User-A 1502) to obtain information about current MSC 1504 for User-A 1502. Once HLR 1508 returns the information, SMSC Emulator 1509 may use the result of the SRI_FOR_SM request as the address for a MT_FORWARD_SM request to send the message in SMS format, along with the MSISDNs for User-A 1502 and User-B 1522, to the current MSC 1504 for User-A 1502. In other words, SMSC 1506 may be bypassed by embodiments of the present invention. Current MSC 1504 receives the request knows how to deliver to the proper SMS recipient (i.e., SMS User-A 1502.) The current Message Switching Center (MSC) 1504 sends the SMS message through a base station and tower to SMS User-A 1502. SMS User-A 1502 receives the SMS message and the SMS message appears to SMS User-A 1502 along with the MSISDN for User-B 1522.

Thus, embodiments of the present invention retain control over the message delivery and any necessary retries rather than delegating responsibility to SMSC 1506. Advantageously, because embodiments get presence information from the IM/IP domain, the message may be delivered on a different delivery path. In contrast, SMSC 1506 tries to deliver SMS messages via only SMS.

In some embodiments, an IM domain may have a Federation Interface enabling a user with in a particular Instant Messaging (IM) domain to communicate with users in a different IM domain. In some embodiments the Federated Interface may be used to send and receive messages into an IM domain on behalf of users who do not have a valid IM subscription because the user may appear to be in a domain in which the IM domain has an interoperability agreement in place.

Figure 16A:
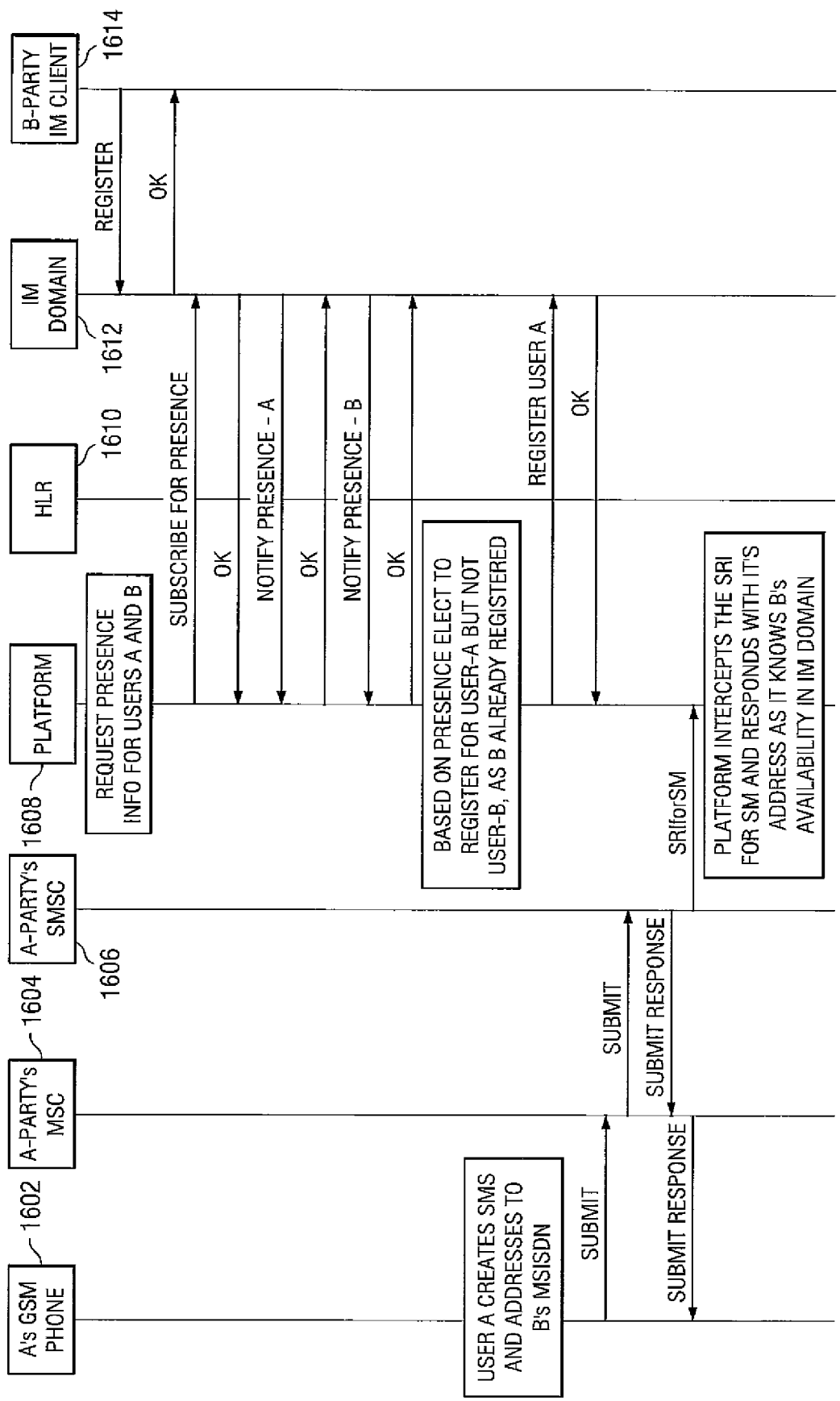

FIG. 16 depicts an exemplary flow diagram in which an Instant Messaging (IM) domain may not support multiple points of presence (i.e. a user may not register the same identity with the domain concurrently from different applications at any given time) and both User-A and User-B have MSISDNs and IM identities. In this embodiment, the platform may need to control its registration with the IM domain. User-B IM Client 1614 may send a request to register with IM domain 1612. Registering with IM domain 1612 may include "signing in." In one embodiment, a network bridge such as network bridge 130 in FIG. 1 requests presence information from IM domain 1616. Platform 1608 sends a request to IM domain 1612 to subscribe for presence. IM domain 1612 may send an affirmative response, and may also send a message to platform 1608 including presence information about User-A and User-B. Based on the presence information about User-B that indicates User-B is already registered in IM domain 1616, some embodiments of the present invention may not register for User-B. Based on the presence information about User-A that indicates User-A is not registered in IM domain 1612, some embodiments of the present invention may register for User-A.

Once platform 1608 has registered for User-A, User-A may send SMS messages from User-A's GSM phone 1602 to User-B's MSISDN and the Platform deliver the SMS as an IM to User B's IM Client 1614. In FIG. 16, when User-A creates a SMS message on User-A's GSM phone 1602, the SMS message may be addressed to a MSISDN for User-B.

In one embodiment, elements in the SMS domain may perform the same functions they normally perform. In particular, User-A 1602 may create and send a SMS message to the current MSC 1604 for User-A 1602 using the same functionality described in FIG. 12. Similarly, current MSC 1604 for User-A 1602 forwards the SMS message to User-A's SMSC 1606 via SS7/MAP MO_MAP FORWARD_SM request. User-A's SMSC 1606 issues a SS7/MAP request SEND_ROUTING_INFO_FOR_SM to get identification of the current MSC 1616 for User-B's SMS phone (not shown). Advantageously, these steps may follow the normal procedures for User-A's handset 1602, current MSC 1604, and SMSC 1606. Thus, the domain in which User-A's handset 1602, current MSC 1604 and SMSC 1606 reside may use existing technology.

The SRI_FOR_SM request sent by SMSC 1606 may be intercepted by platform 1608 (such as by HLR Proxy 1410 in FIG. 14) such that HLR 1610 may not receive the request. Platform 1608 may then respond to the request with a different address than that of User-B's current MSC. In some embodiments, platform 1608 may respond to SMSC 1606 with an address of platform 1608 based on the presence information indicating that User-B 1618 is registered in IM domain 1612.

In particular, the address information returned by platform 1608 in its response to the SRI_For_SM request sent from the SMSC 1606 may not be the identity of a MSC for User-B, but may instead identify a MSC Proxy (such as MSC Proxy 1312 in FIG. 13) in platform 1608 according to one embodiment. When SMSC 1606 receives the address information from platform 1608, SMSC 1606 forwards the SMS message using SS7/MAP MT_FORWARD_SM based on the response request to platform 1608 instead of forwarding the SMS message to User-B's current MSC.

In some embodiments, platform 1608 may create an IM Message based on the SMS message. Platform 1608 may also change the identities of User-A and User-B from their respective MSISDNs to their IM identities. Platform 1608 may then forward the IM message and the IM identities of User-A and User-B to IM domain 1612. IM domain 1612 may then forward the IM message to User-B IM Client 1614 based on the IM identity provided by platform 1608. Thus, User-B is able to receive an IM message on User-B's IM client 1614 sent as a SMS message from User-A's GSM Phone 1602.

If User-B 1614 wishes to respond to User-A 1602, user B 1614 may send an IM message that embodiments of the present invention are able to transform into SMS messages. In the flow diagram depicted in FIG. 16, User-B 1614 sends an IM message to IM domain 1612 intended for User-A's phone 1602. IM domain 1612 forwards the IM message to platform 1608 because platform 1608 is the active point of presence for User-A 1602. Platform 1608 sends a SRI_FOR_SM request to HLR 1610 to get address information for User-A 1602. HLR 1610 returns the address information to platform 1608, and platform 1608 sends the SM message to current MSC 1604 for User-A 1602 using SS7/MAP MT_FOR-WARD_SM. MSC 1604 forwards the SM message to User-A 1602 which includes the MSISDN for User-A 1602, along with the MSISDN for User-B 1618. User-A 1602 sends an acknowledgement to indicate the SMS message has been received. The acknowledgement is sent through tower and base station to MSC 1604 and is forwarded to Platform 1608. Using this embodiment, if the message is not acknowledged by User-A 1602 or cannot be delivered to User-A, platform 1608 and not User-A's SMSC 1606 would perform any retries. Advantageously, embodiments of the present invention may try other formats for delivering the message to User-A 1602. For example, if platform 1608 has information indicating User-A 1602 may be able to receive the message in an IMS format, platform 1608 may transform the original IM message or the transformed SMS message into an IMS message and deliver using standard IMS procedures. In contrast, if platform 1608 forwarded the SMS message to User-A's SMSC 1606 and User-A failed to respond or receive the SMS message, either SMSC 1606 would keep trying using only an SMS format or may time-out trying to deliver the message and User-A 1602 may not receive the message.

Figure 17A:
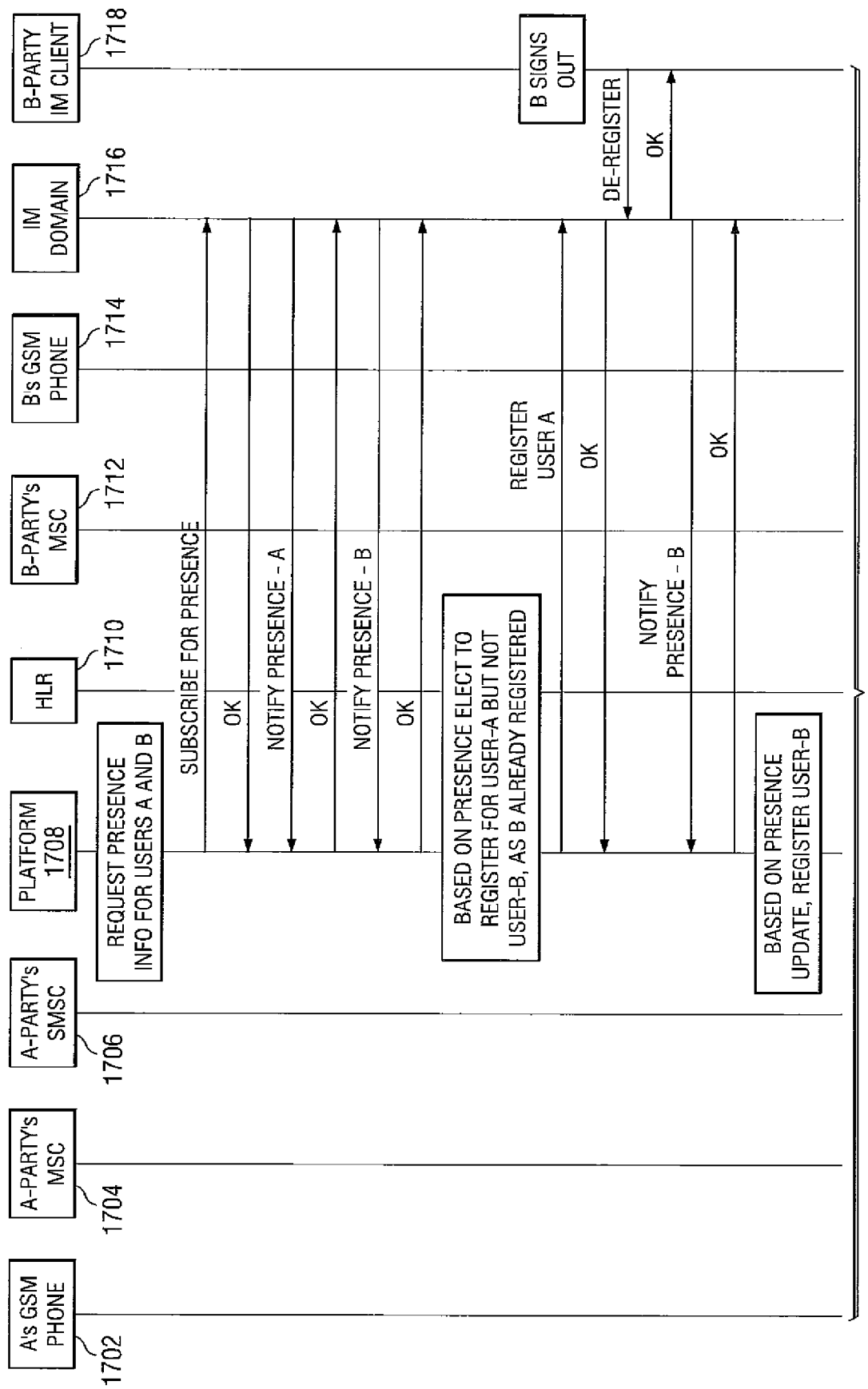

FIG. 17 depicts a flow diagram of one embodiment in which an IM domain does not support multiple points of presence. In one embodiment both User-A and User-B have MSISDNs and IM identities. In this embodiment, platform 1708 requests presence information from IM domain 1716 for User-A 1702 and User-B 1718. Platform 1708 may subscribe for presence with IM domain 1716, to which IM domain 1716 may send presence information for User-A 1702 and User-B 1718. Based on the presence information received from IM domain 1716, platform 1708 may register with IM domain 1716 for User-A 1702, but may elect to not register for User-B 1718.

If at some point User-B 1718 elects to sign-out of IM domain 1716, IM domain 1716 may send the updated presence information to platform 1708, and platform 1708 may elect to register with IM domain 1716 for User-B IM client 1718. In some embodiments, platform 1708 may elect to register with IM domain 1716 for User-B IM client 1718 based on other criteria, such as idle time, or an event driven by the user.

If User-A 1702 sends an SMS message to User-B, the SMS message may be sent to a tower and base station to the current MSC 1704 for User-A 1702 and in turn to User-A's SMSC 1706, which may send the SEND_ROUTING_INFO_FOR_SM to platform 1708, using, for example, techniques and protocols described as they relate to FIG. 13. When platform 1708 determines that User-B is not registered with IM domain 1716, platform 1708 may forward the SRIforSM request to HLR 1710. HLR 1710 returns address information for User-B's GSM Phone 1714. Platform 1708 sends the SRI_FOR_SM response to User-A's SMSC 1706. The SRI_FOR_SM response does not contain an address for platform 1708. Instead, the address for User-B's current MSC 1712 is returned to SMSC 1706. SMSC 1706 forwards the SMS message to User-B's current MSC 1712, which forwards the SMS message to User-B's GSM Phone 1714. Thus, embodiments of the present invention may efficiently provide a platform for interoperability by allowing messages that require no transformation to use existing technology, and may transform only those messages that require or may otherwise benefit from transformation.

A limitation on IM communication has been the recognition of only one point of presence. For example, if User-A logged on to an IM service on a home computer and then logged on to the IM service at a work computer, the IM service would recognize only one point of presence and might therefore terminate a connection with the home computer. As PDA's, cell phones, and other mobile devices populate the communication field, one trend in IM environments is the ability to support multiple points of presence. FIGS. 18A-B and 19A-C depict flow diagrams for embodiments of methods for providing communication in which an IM domain supports multiple points of presence.

Figure 18A:
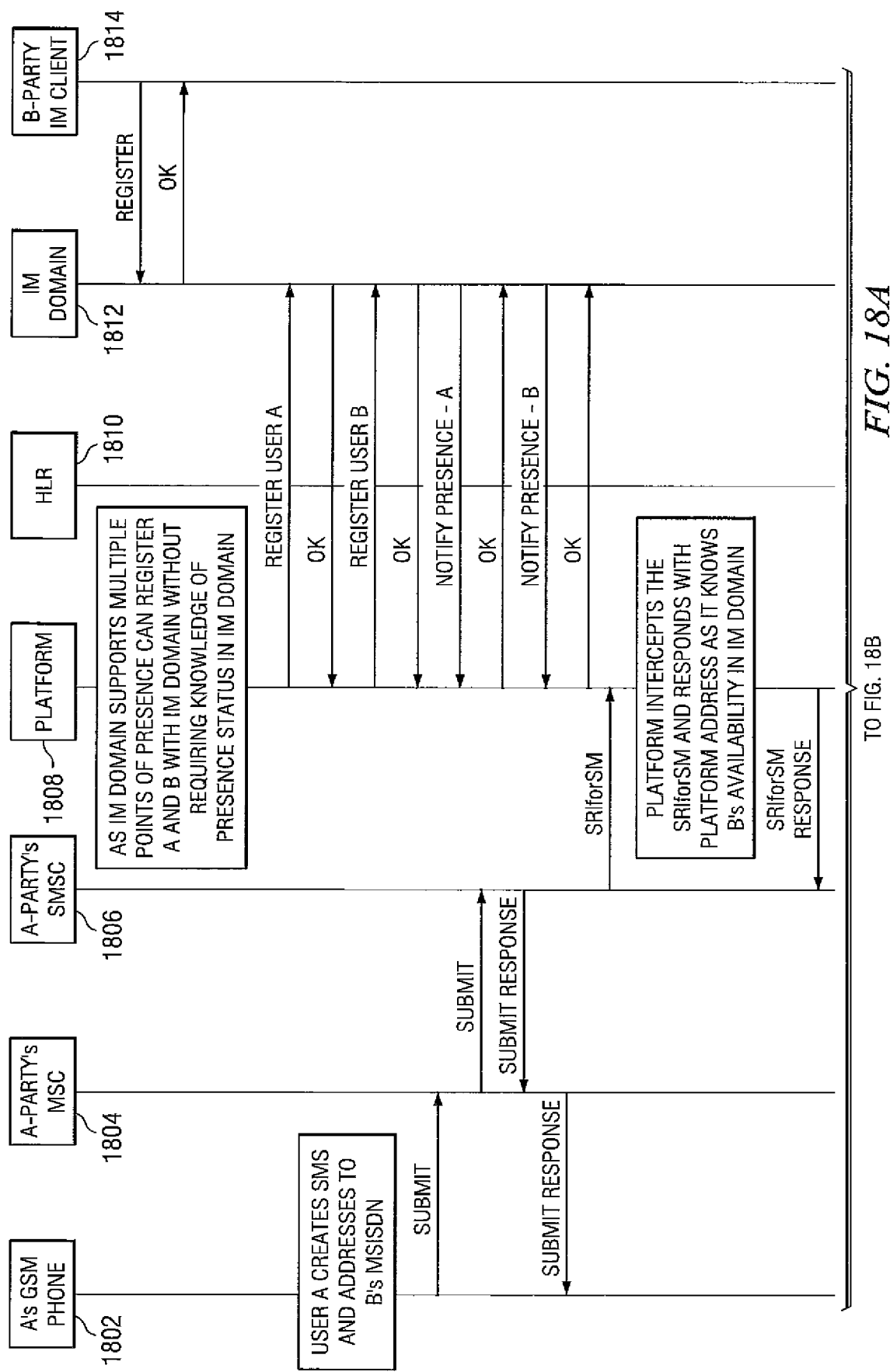
FIGS. 18A and 18B depict a flow diagram illustrating one embodiment for how a SMS message can be sent to a device in an IM domain in which the IM domain supports multiple points of presence.
Figure 18B:
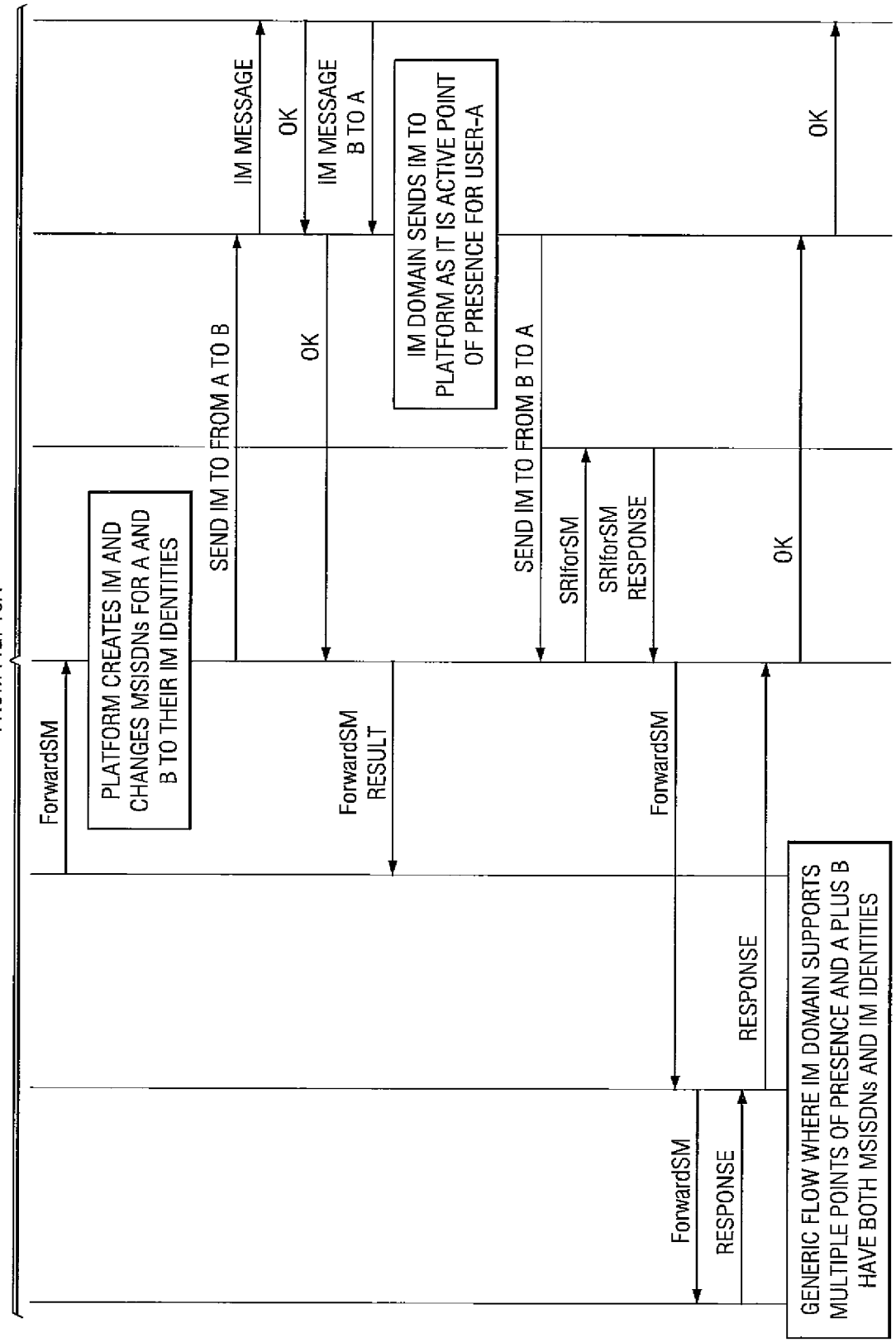

FIGS. 18A and 18B depict a flow diagram for one embodiment of a method for providing communication between a user in an IM domain with a user in an SMS domain. In one embodiment, an IM domain supports multiple points of presence and platform 1808 can register User-A and User-B with the IM domain without requiring knowledge of presence status in the IM domain. User-A creates a SMS message on A's GSM Phone 1802 and addresses the SMS message to B's MSISDN. A-Party's MSC 1804 receives the SMS message and forwards the request to A-Party's SMSC 1806, which sends a response to A-Party's MSC 1804, which forwards the response to A's GSM Phone 1802. When A-Party's SMSC 1806 sends an SRI_FOR_SM request to HLR 1810, platform 1808 intercepts the message and responds to the message with an address associated with platform 1808 because it knows the availability for User-B in the IM domain. Upon receiving a response to the SRI_FOR_SM request, A-Party's SMSC 1806 uses a SS7/MAP MT_FORWARD_SM request to forward the SMS message to an address that appears to be in the SMS domain. Instead, Platform 1808 receives the SMS message and creates an IM message and changes the MSISDN's for User-A and User-B to their IM identities. Platform 1808 sends an IM message to IM Domain 1812 from User-A to User-B. IM Domain 1812 forwards the IM message to B-Party IM Client 1814 based on User-B's IM identity provided by Platform 1808. Upon receipt of the IM message, B-Party IM Client 1814 sends a response to the IM domain and this is in turn sent to platform 1808. The platform on receiving acknowledgement that IM was delivered responds to A-Party's SMSC 1806 indicating a MT_FORWARD_SM result, such that A-Party's SMSC 1806 does not keep sending the information. If User-B wants to send an IM response to User-A, User-B creates an IM message from User-B 1814 to User-A's IM identity and sends it to IM domain 1812. IM Domain 1812 sends the IM message to platform 1808 because platform 1808 is the active point of presence for User-A. Platform 1808 may normalize the IM message into a platform independent format and then apply one or more services to the normalized message based on rules, policies, or preferences to create a SMS message for User-A's GSM Phone 1802.

In some embodiments, platform 1808 may send a SRI_FOR_SM request to HLR 1810 to get address information for User-A's GSM Phone 1802. Once a response to the SRI_FOR_SM has been received with address information for User-A's GSM Phone 1802, platform 1808 may send a MT_FORWARD_SM request to A-Party's MSC 1804, which forwards the SMS message via the appropriate tower and base.

In some embodiments (not shown), platform 1808 may send the SMS message it created to A-Party's SMSC 1806 for routing by A-Party's SMSC 1806. One advantage to platform 1808 requesting address information from HLR 1810 and routing the SMS message to A-Party's MSC 1804 is the control maintained by platform 1808, which particularly enables platform 1808 to change the method of delivery in the event User-A's GSM Phone 1802 is busy or an SMS message can otherwise not be delivered. In these events, platform 1808 may be able to create a message for User-A in another domain.

Figure 19A:
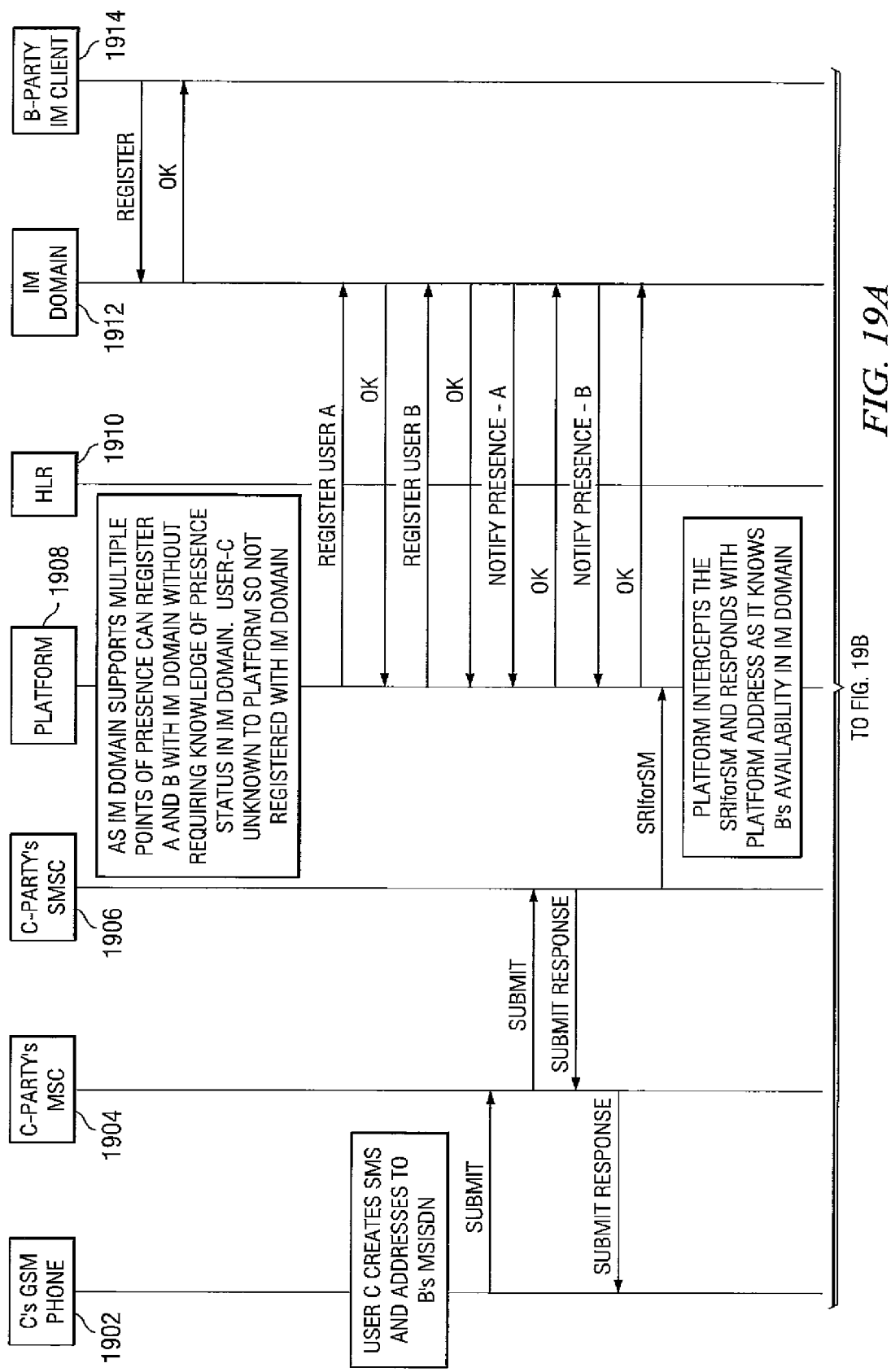

In some embodiments, a user may wish to deliver a message to another user in a domain in which the sender does not have an identity. For example, in some IM environments, delivery of an IM message required the IM Domain to know the IM identity of the sender. FIGS. 19A, 19B, and 19C depict a generic flow diagram for one embodiment in which User-A and User-B may be registered with an IM Domain and a third user (User-C) wishes to communicate with User-B but does not have an IM identity. In some embodiments, IM Domain 1912 may support multiple points of presence and platform 1908 can register User-A and User-B with IM Domain 1912 without requiring knowledge of presence status in IM Domain 1912, but platform 1908 may not be able to register User-C with IM Domain 1912 because User-C is unknown to IM Domain 1912.

In one embodiment, if User-C creates a SMS message on C's GSM Phone 1902 and addresses it to User-B's MSISDN, the SMS message may be sent through a base station and tower to C-Party's MSC 1904. C-Party's MSC 1904 forwards the SMS message to C-Party's SMSC 1906 using SS7/MAP MO_FORWARD_SM request, which submits a response through C-Party's MSC 1904 to C's GSM Phone 1902 that C-Party's SMSC 1906 has received the request. When C-Party's SMSC 1906 issues an SS7/MAP request SEND_ROUTING_INFO_FOR SM (SRI_FOR_SM) to get address information from User-B's HLR (not shown) platform 1908 may intercept the request and respond to C-Party's SMSC 1906 with address information corresponding to platform 1908. Advantageously, platform 1908 knows the availability of User-B in IM Domain 1912 because platform 1908 registered on behalf of User-B and may therefore receive updated presence information about User-B from IM Domain 1912.

In some embodiments, upon receiving a response for the SRI_FOR_SM request, C-Party's SMSC 1906 uses information in the response to forward the SMS message element using SS7/MAP request MT_FORWARD_SM to an address, which may correspond to a proxy, adapter, or other element in platform 1908.

When platform 1908 receives the SMS message from C-Party's SMSC 1906, the message is normalized into a network-independent format and one or more services may be applied to the normalized message to create a message suitable for delivery in IM Domain 1912.

In some embodiments, platform 1908 may dynamically generate an IM identity for User-C suitable for IM Domain 1912. In some embodiments, platform 1908 may deliver an IM message that is based on the SMS original message to B-Party IM Client 1914 using a Federated Interface for IM Domain 1912. In some embodiments, platform 1908 may dynamically generate an IM identity for User-C to enable communication with User-B. For example, User-B who is registered with IM Domain 1912 may have an IM identity User-B@yahoo.com, and User-C who does not have an IM identity, but has an MSISDN of 44-123-456-7890 may have a dynamically generated IM identity of 441234567890@sms.724.com. Thus, using a Federated Interface, User-C who does not have an IM identity in User-B's IM domain may communicate with User-B using embodiments and features of platform 1908. By generating an IM identity for User-C and sending the IM message generated by platform 1908 through a Federated Interface for IM Domain 1912, embodiments of platform 1908 may not appear to IM Domain 1912 as a part of IM Domain 1912, but platform 1908 may appear as another IM domain that communicates with IM Domain 1912. In some embodiments, the ability to dynamically generate an IM identity may allow platform 1908 to extend the functionality of IM Domain 1912 to non-users of IM Domain 1912 without a large infrastructure.

Once platform 1908 has created a dynamic IM identity for User-C and generated an IM message based on the SMS message sent by User-C's GSM Phone 1902 or the normalized message, platform 1908 may send the IM message to IM Domain 1912 across a Federated Interface for IM Domain 1912. IM Domain 1912 is able to receive the IM message in an IM format and with a valid IM identity corresponding to an IM device in another IM domain. IM Domain 1912 may send the IM message to B-Party IM Client 1914 using standard IM protocols, because the message and identity appear valid for IM Domain 1912. Advantageously, embodiments of the present invention enable IM Domain 1912 to use standard IM protocol so B-Party IM Client 1914 may be unaware that User-C is not in an IM Domain.

If User-B sends an IM message to User-C, User-B identifies User-C by the dynamically generated identity (e.g., 441234567890@sms.724.com). IM Domain 1912 receives the IM message and may send it across a Federated Interface to platform 1908 because platform 1908 is the point of communication for all users, including User-C, with addresses in the given domain used for User-C's dynamic IM identity. Platform 1908 receives the IM message, normalizes the message into a platform-independent format, and applies one or more services to the message to create a SMS message suitable for delivery to User-C's GSM Phone 1902. Platform 1908 may issue a SRI_FOR_SM request to HLR 1910, and upon receiving address information for User-C's GSM Phone 1902, forwards the SMS message to User-B's MSC 1904 with a SS7/MAP MT_FORWARD_SM request. C-Party's MSC 1904 delivers the SMS message element according to its standard procedures via the appropriate base station and tower for delivery to User-C's GSM Phone 1902.

If C's GSM Phone 1902 sends a response to indicate receipt of the message, the response may be sent to C-Party's MSC 1904 and forwarded directly to platform 1908 in embodiments in which platform 1908 has a SMSC proxy or contains the functionality of a SMSC. Platform 1908 may normalize the response, apply one or more services to the response, generate a message in an IM format, and forward the response across a Federated Interface to IM Domain 1912, which forwards the response to B-Party IM Client 1914.

Thus, to users of IM Domain 1912 (i.e., B-Party IM Client 1914), a SMS message sent from C's GSM Phone 1902 appears as an IM message sent from a user in another IM Domain 1912.

It should be understood that the inventive concepts disclosed herein are capable of many other modifications. To the extent such modifications fall within the scope of the appended claims and their equivalents, they are intended to be covered by this patent. It should also be understood that the term "a" as used herein generally means "one or more" and is not intended to be construed in a singular sense. In addition, the operations described in connection with the methods of the present invention need not necessarily be executed in the sequence described, as they may be executed in a different sequence consistent with the principles of the present invention.

Thus, the above examples illustrate how users may communicate with each other without needing to know about each other's technology requirements. The senders do not need to be aware of which channel the receivers are using. Furthermore, the senders' client devices and the receivers' client devices may use different technologies and for a given user this can vary as a user switch modes of devices (e.g. phone, IM, etc). The senders' software and the receivers' software may or may not be altered. The senders and receivers do not need to subscribe to the same type of network or use the same type of service.

As a result, users of legacy networks can be seamlessly connected to users of newly developed or next-generation networks. Hence, barriers to technology are advantageously removed. True roaming and enrichment for IM clients (such as Yahoo®, Google Talk®, MSN®, Office Communicator®, AOL's TalkNow®, etc.) are enabled. The user experience is improved and the user community is expanded. Features of embodiments of the present invention spur adoption of new technology by extending the reach into legacy networks. Business models for new services can be driven from both the new and existing subscriber base. Usage of services is increased, leading to higher revenues for service providers.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for interoperability between a first network communicating according to a first protocol associated with a first user and a second network communicating according to a second protocol associated with a second user, the system comprising:
   a Home Location Register (HLR) Proxy for intercepting SRI_For_SM requests sent from a first Short Message Service Center (SMSC) in the first network intended for a HLR in the second network and returning to the SMSC a response having address information for a second SMSC in the second network;
   a Message Switching Center (MSC) Proxy associated with the address information returned to the SMSC and configured for receiving a first communication from the first SMSC, wherein the first communication has an associated first identity of the first user and first identity of the second user based on the first network;
   an adapter configured to normalize the first communication received from the first network into a network-independent format;
   a bridge comprising:
      an application layer comprising logic to select the second network based on presence information associated with the second user, to determine a second communication valid for the second network and to determine a second identity for the first user and a second identity for the second user based on the selected second network; and
      a component layer having services with associated functionality and accessible to the application layer,
      wherein the bridge is configured to inspect the normalized first communication and to generate a second communication for the second network using one or more components based on the normalized first communication; and
   one or more messaging emulators for sending the second communication to a gateway in the second network, wherein the one or more messaging emulators comprise:
      an Internet Protocol (IP) messaging emulator configured to send the second communication to a user in an IP network based on address information returned by the HLR proxy and receive an IP message from an address in the IP network, wherein the adapter is configured to normalize the IP message into a network-independent format and the bridge is configured to inspect the normalized IP message and generate a third communication for the first network using one or more components based on the normalized IP message and send the third communication to the first network, and
      an SMSC emulator configured to send a request to a HLR in the first network, receive a response from the HLR in the first network, and forward the third communication to a current Message Switching Center (MSC) in the first network.

2. The system of claim 1, wherein the bridge comprises an application bridge.

3. The system of claim 1, wherein the bridge comprises a network bridge.

4. The system of claim 1, wherein the first identity of the first user and the first identity of the second user in the first network are mapped from Mobile Station International Subscriber Directory Numbers (MSISDNs) to determine the second identity of the first user and the second identity of the second user.

5. The system of claim 1, wherein the system is configured to receive presence update information about one or more users from an IP domain, and register with the IP domain on behalf of one or more users based on the presence update information received from the IP domain.

6. A method for providing interoperability between networks, the method comprising the steps of:
   receiving a request for address information, by a Home Location Register (HLR) Proxy, from a first network which communicates according to a first protocol;
   responding to the request with address information for a Message Switching Center (MSC) Proxy;

receiving a first communication from the first network, by the MSC Proxy, wherein the first communication has an associated first identity of the first user and first identity of the second user based on the first network;

normalizing the first communication into a network-independent format;

routing the normalized first communication to an application server comprising an application layer having application logic for generating an appropriate second communication, and a component layer having services with selected functionality and accessible to the application layer, wherein the application server is configured to select the second network based on presence information associated with the second user, to generate the second communication for a second network which communicates according to a second protocol based on the normalized first communication and to determine a second identity for the first user and a second identity for the second user based on the selected second network;

receiving the second communication from the application server;

sending the second communication to an emulator of a set of emulators; and routing the second communication to a gateway in the second network which communicates according to a second protocol, wherein the set of emulators comprises:

an Internet Protocol (IP) messaging emulator configured to send the second communication to a user in an IP network based on address information returned by the HLR proxy and receive an IP message from an address in the IP network, wherein the IP message is normalized into a network-independent format and the normalized IP message is inspected and a third communication for the first network is generated using based on the normalized IP message and sent to the first network, and an SMSC emulator configured to send a request to a HLR in the first network, receive a response from the HLR in the first network, and forward the third communication to a current Message Switching Center (MSC) in the first network.

7. The method of claim 6, wherein the step of receiving a message from a first network comprises the step of receiving a Short Message Service (SMS) message, and wherein sending the second communication to an emulator comprises the steps of:

mapping the first identity of the first user and the first identity of the second user in the first network and from Mobile Station International Subscriber Directory Numbers (MSISDNs) to the second identity of the first user and the second identity of the second user based on Internet Protocol (IP); and sending an IP message to an IP messaging emulator.

8. The method of claim 6, further comprising the steps of:

registering with an IP domain on behalf of one or more users of the IP domain, wherein messages sent by the one or more users of the IP domain are received by the IP messaging emulator.

9. The method of claim 6, further comprising the steps of:

receiving presence update information about one or more users from an IP domain, and registering with the IP domain on behalf of one or more users based on the presence update information received from the IP domain.

10. A method for providing interoperability between a Short Message Service (SMS) network and an Internet Protocol (IP) network, comprising the steps of:

registering with an IP domain for a first user not registered with the IP domain;

receiving an IP message from the IP domain from a second user registered with the IP domain, wherein the IP message has an associated first identity of the first user and first identity of the second user based on the IP domain;

normalizing the IP message into a normalized first communication having a network-independent format;

routing the normalized first communication to an application server comprising:

an application layer having application logic for selecting the second network based on presence information associated with the second user, to determine an appropriate second communication, and for determining a second identity for the first user and a second identity for the second user based on the selected second network; and a component layer having services with selected functionality and accessible to the application layer, generating, based on presence information associated with the second user, a second communication for the second network which communicates according to a second protocol based on the normalized first communication;

sending the second communication to an emulator of a set of emulators; and routing the second communication to the second network which communicates according to the second protocol, wherein the set of emulators comprises:

an Internet Protocol (IP) messaging emulator configured to send the second communication to a user in the IP network based on address information returned by an HLR proxy and receive an IP message from an address in the IP network, wherein the IP message is normalized into a network-independent format and the normalized IP message is inspected and a third communication for the first network is generated based on the normalized IP message and sent to the first network, and an SMSC emulator configured to send a request to a HLR in the first network, receive a response from the HLR in the first network, and forward the third communication to a current Message Switching Center (MSC) in the first network.

11. The method of claim 10, wherein the step of registering with an IP domain comprises the steps of:

sending a request for network presence information from the IP messaging emulator;

receiving the presence information by the IP messaging emulator; and sending a request to register, by the IP messaging emulator, to the IP domain.

12. A non-transitory machine-readable medium having stored thereon a set of instructions operable for causing the computer to execute the following:

intercept a request for address information from a first user in a first network;

respond to the request with address information for a proxy;

receive a first communication from the first user in the first network which communicates according to a first communication protocol, wherein the first communication has an associated first identity of the first user and first identity of the second user based on the first network;

normalize the first communication into a network-independent format;

select the second network based on presence information associated with the second user;

select a channel of communication;

generate a second communication for a second user in a second network that communicates according to a second communication protocol based on the normalized first communication;

select an identity of the first and second users based on the second network; and send the second communication to the second network using a set of emulators comprising:

an Internet Protocol (IP) messaging emulator configured to send the second communication to a user in the IP network based on address information returned by an HLR proxy and receive an IP message from an address in the IP network, wherein the IP message is normalized into a network-independent format and the normalized IP message is inspected and a third communication for the first network is generated based on the normalized IP message and sent to the first network; and an SMSC emulator configured to send a request to a HLR in the first network, receive a response from the HLR in the first network, and forward the third communication to a current Message Switching Center (MSC) in the first network.

13. The machine readable medium of claim 12, further comprising instructions to:

register with an Internet Protocol (IP) domain for one or more users of a network.

14. The machine readable medium of claim 12, further comprising instructions to:

generate an Instant Messaging (IM) identity for a non-user of an IM domain.

15. The machine-readable medium of claim 12, wherein the first identity of the first user, first identity of the second user, second identity of the first user or second identity of the second user is one of an MSISDN or an identity on an Internet Protocol (IP) based network.

* * * * *